(12) United States Patent
Nagasawa et al.

(10) Patent No.: US 8,450,024 B2
(45) Date of Patent: May 28, 2013

(54) FUEL CELL HAVING A SEPARATOR WITH A FOLDED BACK PART

(75) Inventors: Takeshi Nagasawa, Okazaki (JP); Kazuhiro Watanabe, Toyota (JP); Takuji Nagano, Toyota (JP); Kazutaka Ilsuka, Nissin (JP); Rie Takami, Nishikamo (JP); Naotoshi Miyamoto, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/388,221

(22) PCT Filed: Dec. 1, 2009

(86) PCT No.: PCT/JP2009/006498
§ 371 (c)(1),
(2), (4) Date: Jan. 31, 2012

(87) PCT Pub. No.: WO2011/067805
PCT Pub. Date: Jun. 9, 2011

(65) Prior Publication Data
US 2012/0129074 A1     May 24, 2012

(51) Int. Cl.
*H01M 8/10*     (2006.01)

(52) U.S. Cl.
USPC .......................... 429/457; 429/513; 429/514

(58) Field of Classification Search
None
See application file for complete search history.

(56) References Cited

U.S. PATENT DOCUMENTS

| 7,195,838 B2 * | 3/2007 | Nanaumi et al. ............... 429/480 |
| 2002/0127461 A1 * | 9/2002 | Sugita et al. .................... 429/35 |
| 2003/0157397 A1 * | 8/2003 | Barton et al. ................... 429/44 |
| 2007/0190373 A1 | 8/2007 | Park et al. |
| 2007/0190395 A1 | 8/2007 | Ryu et al. |
| 2007/0298308 A1 * | 12/2007 | Yamamoto et al. ............. 429/34 |

FOREIGN PATENT DOCUMENTS

| JP | 10-92447 A | 4/1998 |
| JP | 2002-198072 A | 7/2002 |
| JP | 2006-10087 A | 4/2006 |
| JP | 2006-221905 | * 8/2006 |
| JP | 2006-221905 A | 8/2006 |
| JP | 2007-214134 A | 8/2007 |
| JP | 2007-214135 A | 8/2007 |
| JP | 2009-43465 A | 2/2009 |
| JP | 2009-93850 A | 4/2009 |
| JP | 2009-152123 A | 7/2009 |

* cited by examiner

*Primary Examiner* — Ula C Ruddock
*Assistant Examiner* — Tony Chuo
(74) *Attorney, Agent, or Firm* — Sughrue Mion, PLLC

(57) ABSTRACT

A fuel cell comprises a membrane electrode assembly including an electrolyte membrane and electrode layers arranged on each surface of the electrolyte membrane respectively, and first and second separators that are formed by processing a metal plate and are arranged so as to sandwich the membrane electrode assembly. At a position outside a position facing the membrane electrode assembly, the separators have an opening that constitutes a reaction gas flow path that is roughly perpendicular to a surface direction of the membrane electrode assembly. The first separator has a folded back part that is formed by folding back at least part of the metal plate of the position at which the opening is formed toward the membrane electrode assembly side along a boundary line on the membrane electrode assembly side of the opening as a fold line. The folded back part has a communication hole that allows communication between an internal flow path space and the reaction gas flow path, the internal flow path space being a space communicated with an end surface of the membrane electrode assembly and being formed between the folded back part and the first separator. The second separator does not have the folded back part.

16 Claims, 28 Drawing Sheets

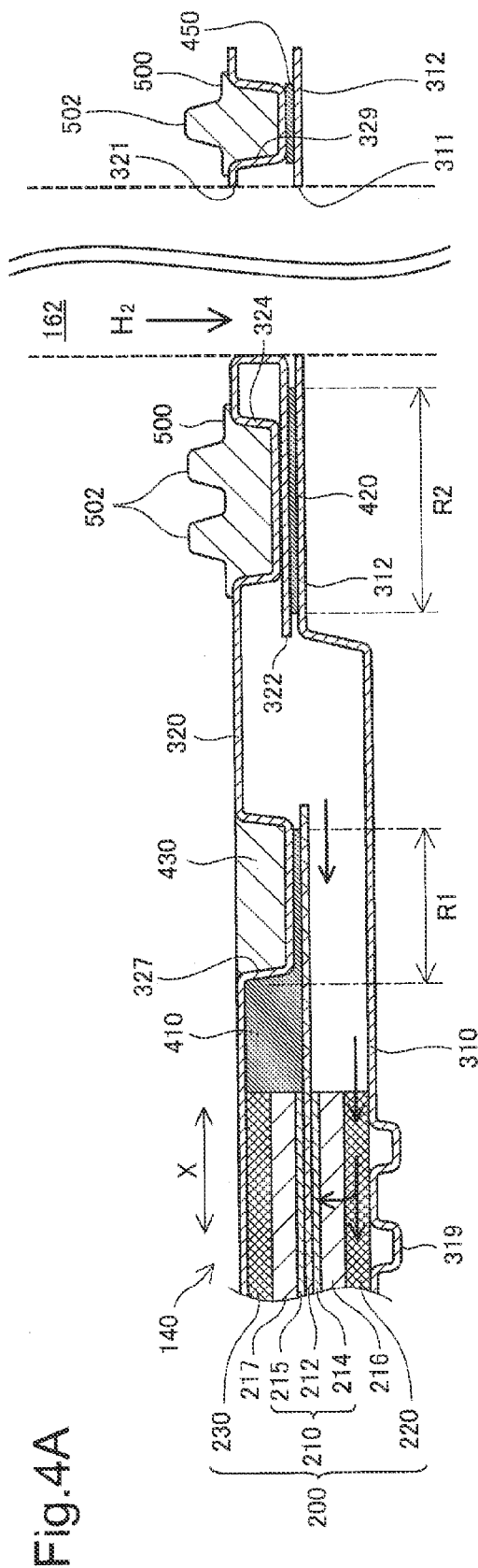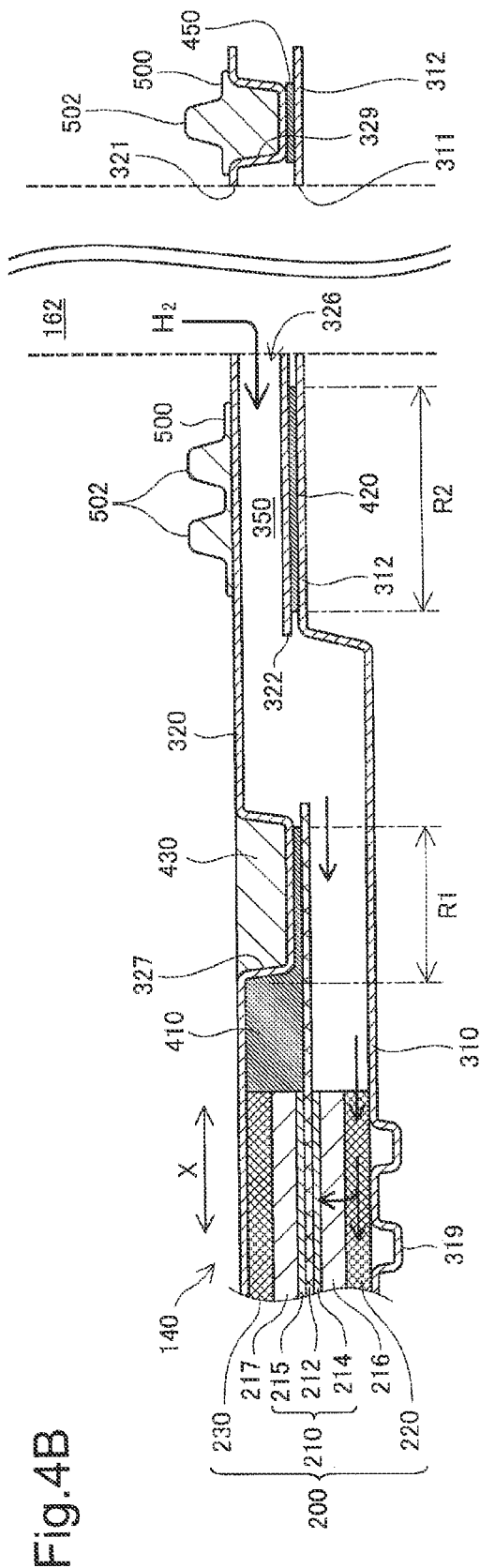

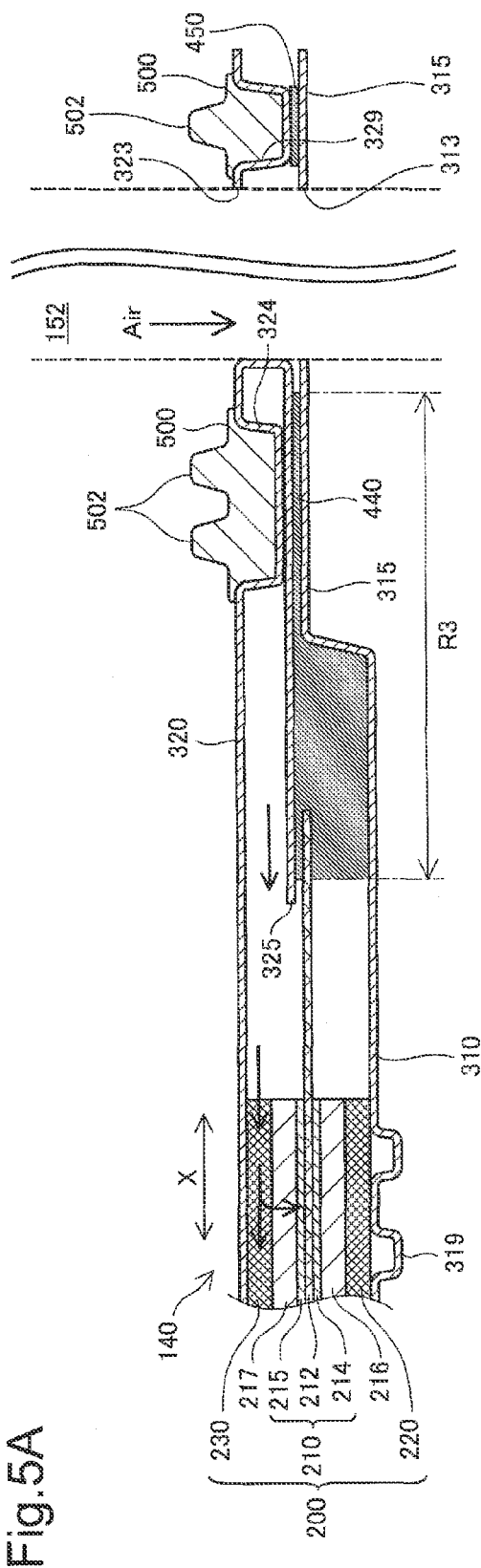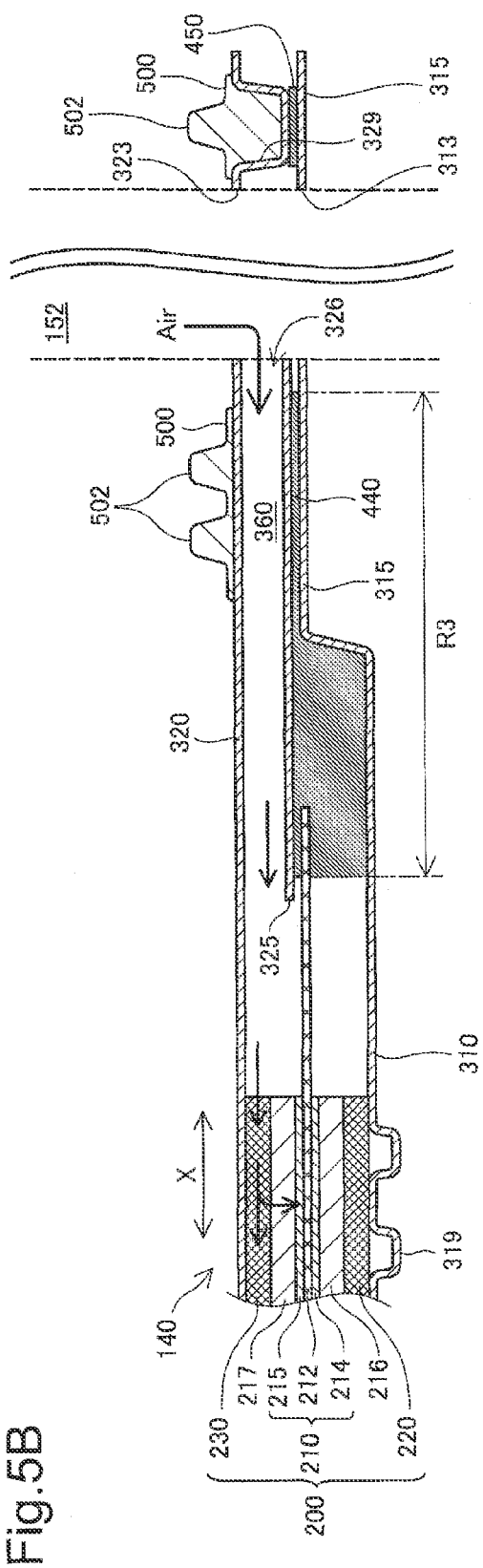

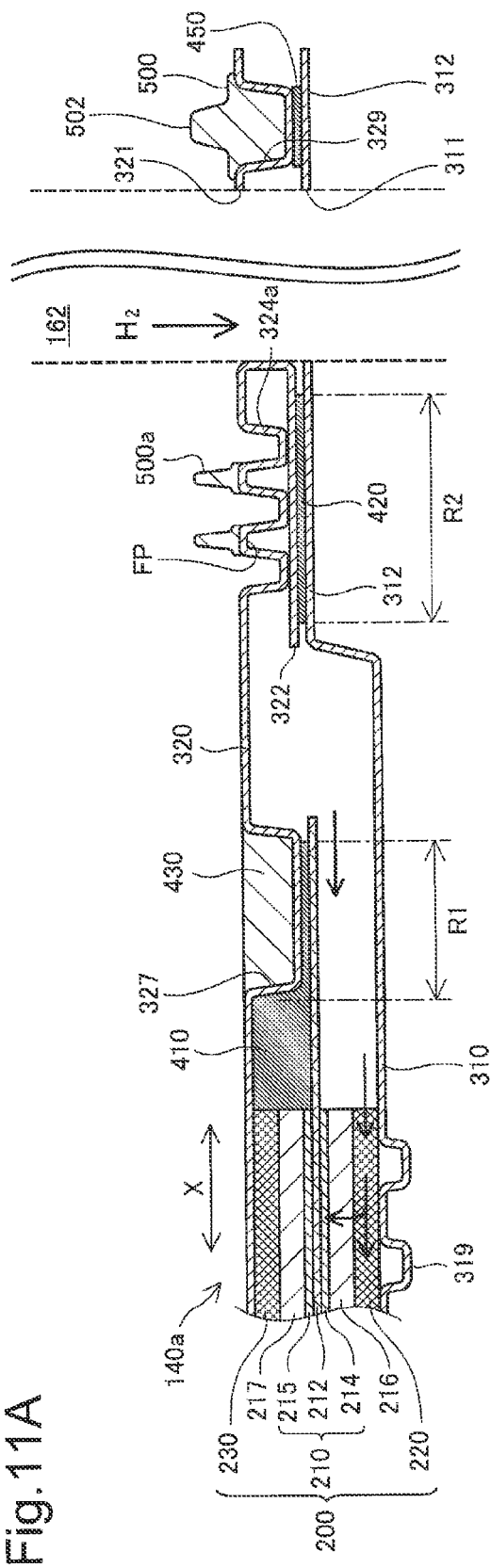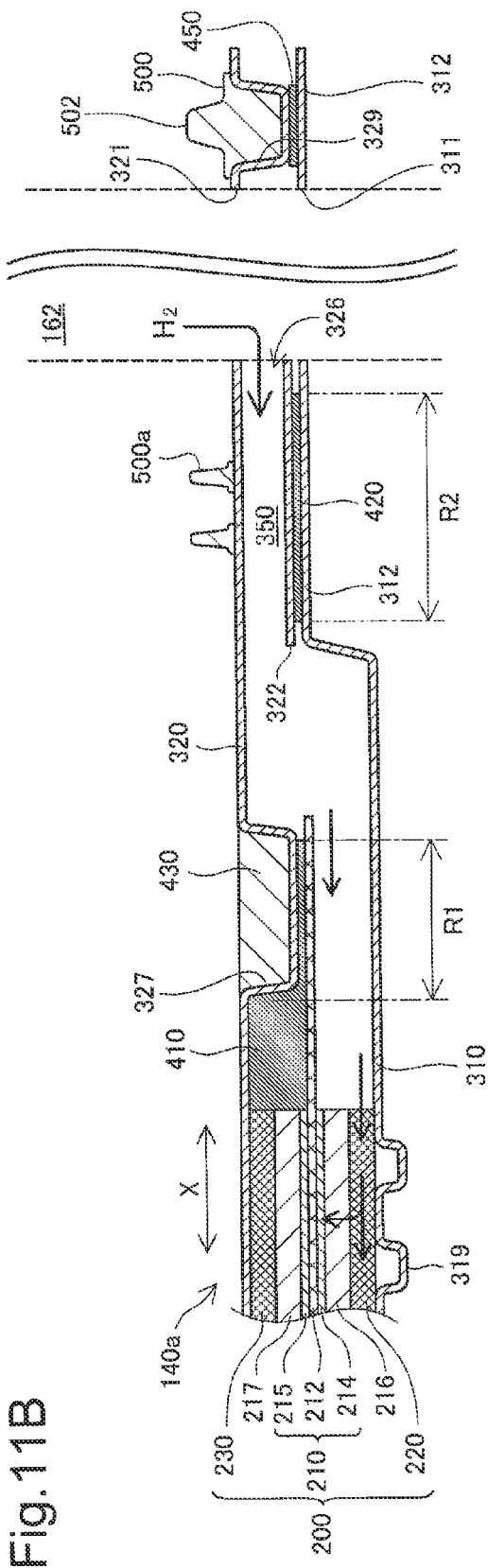

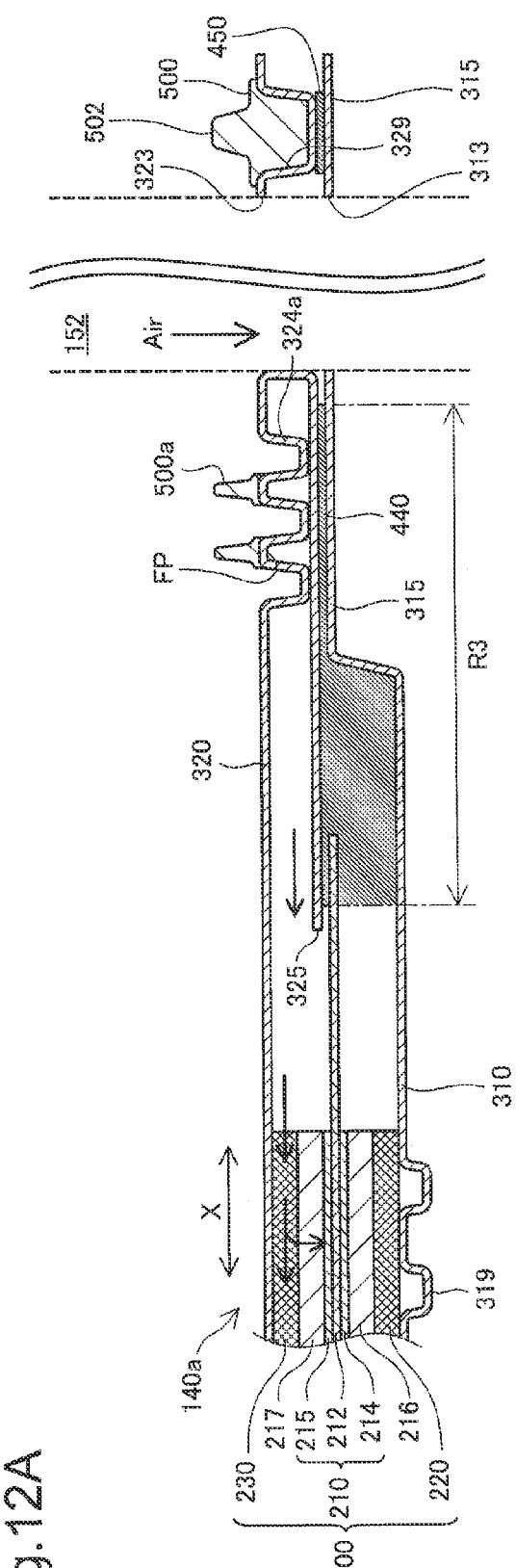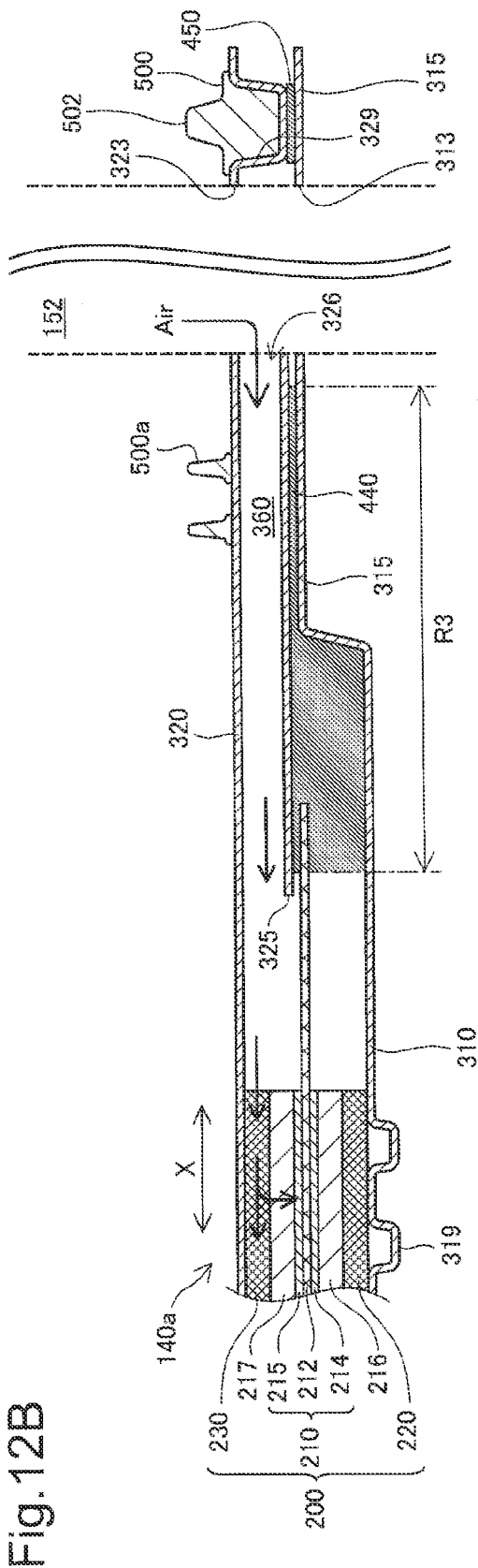

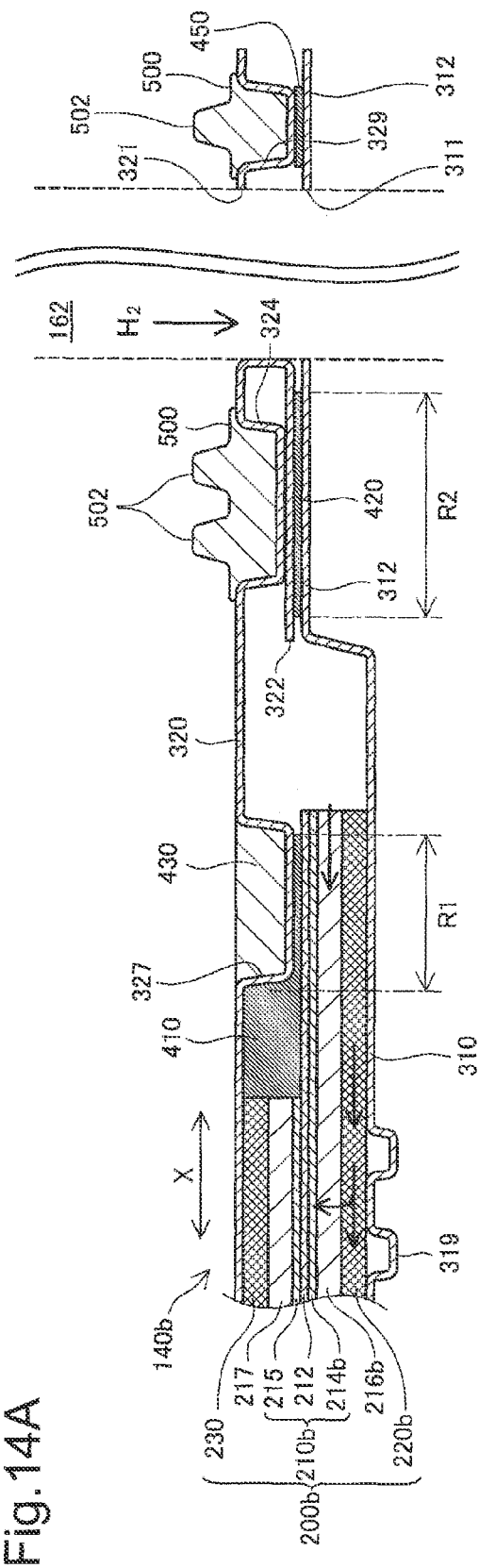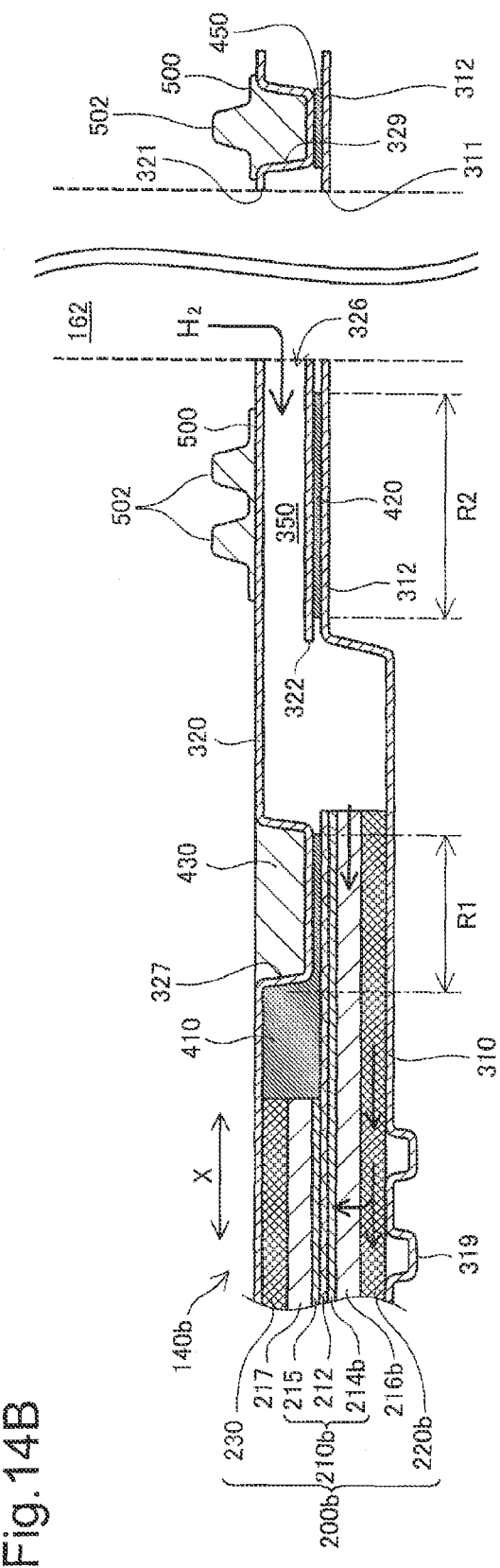

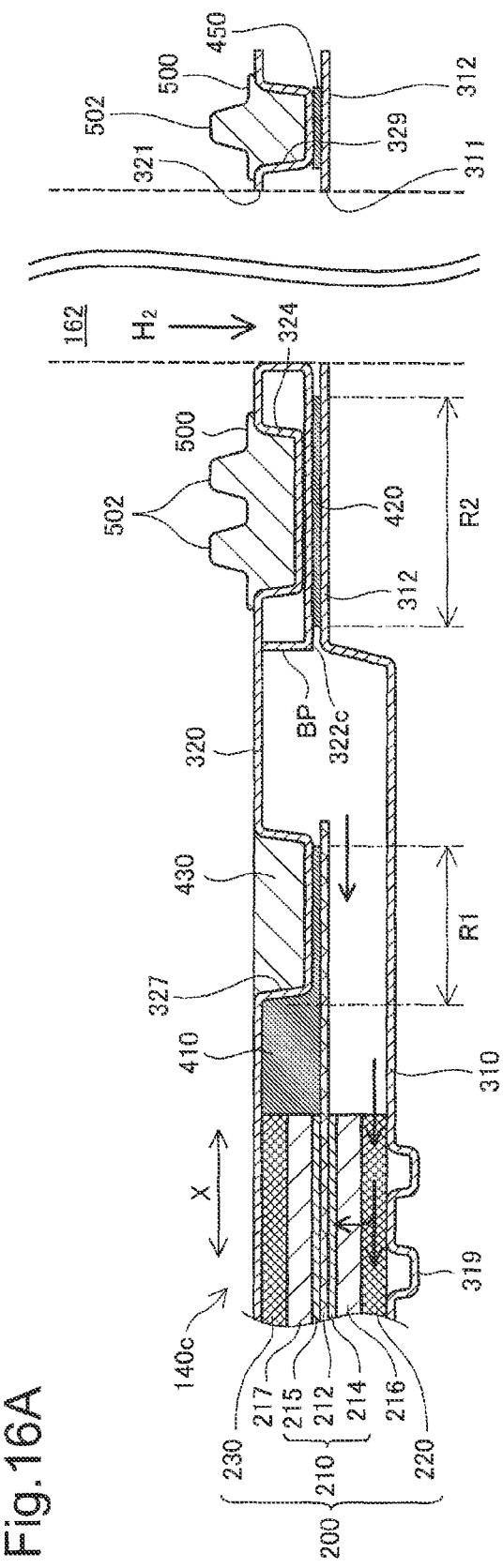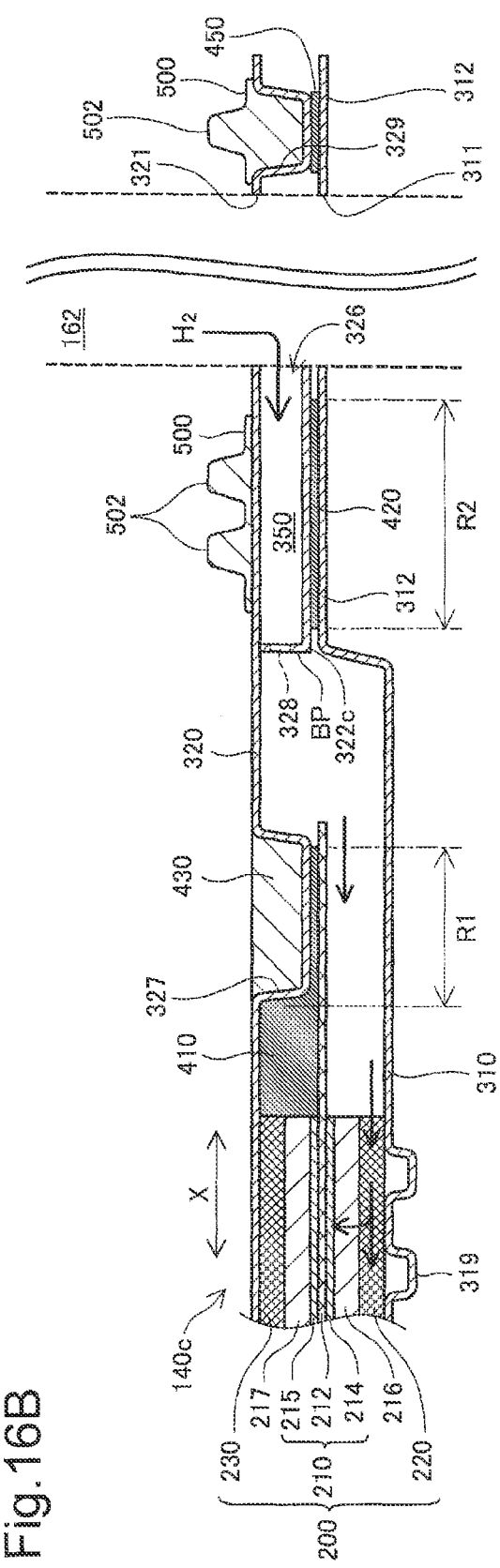

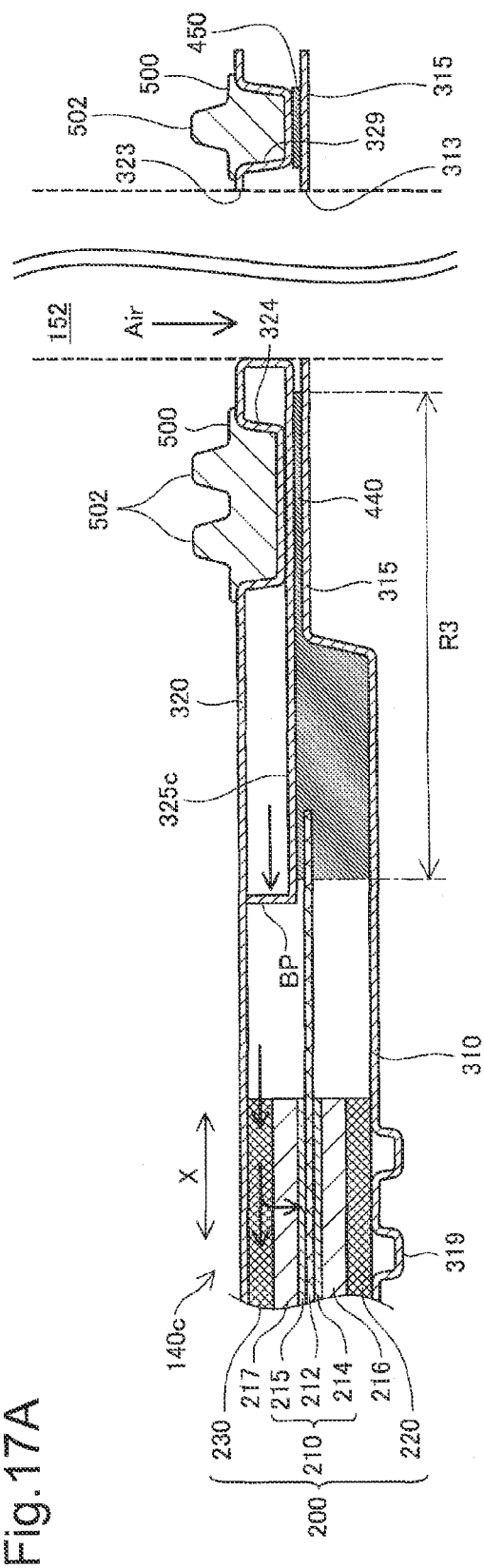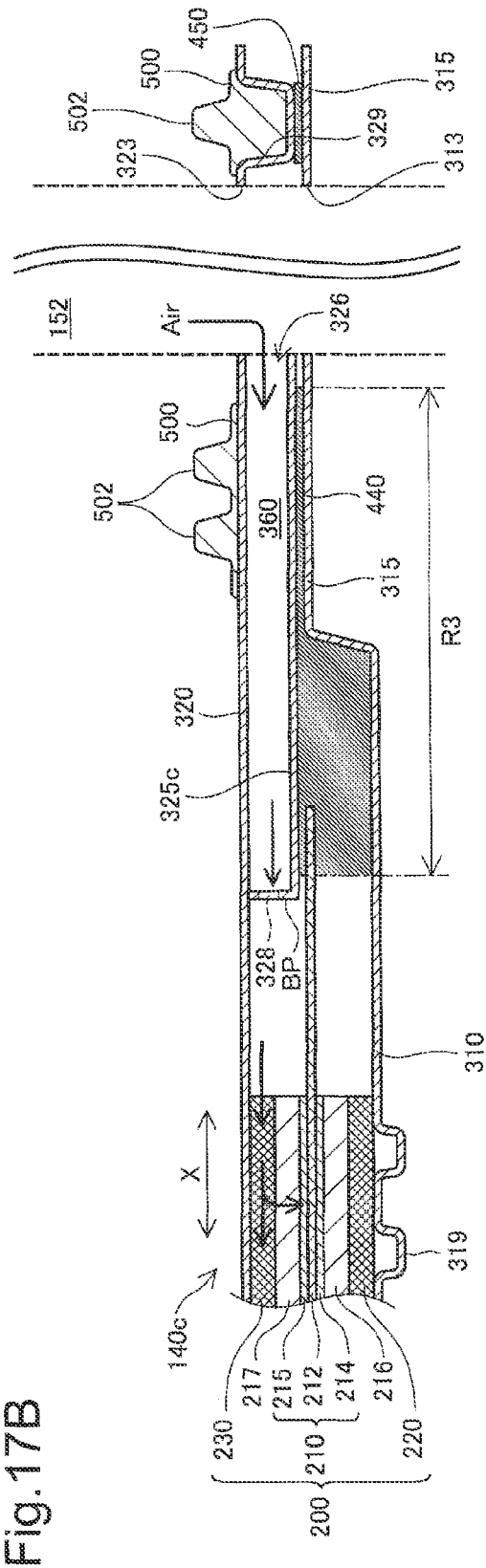

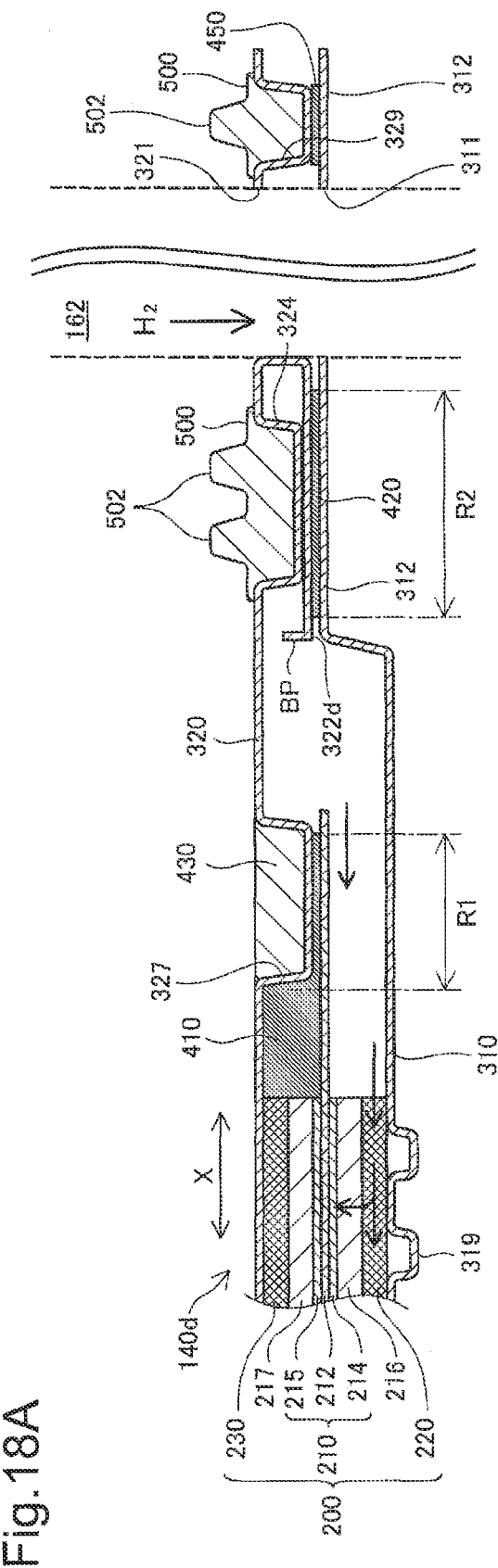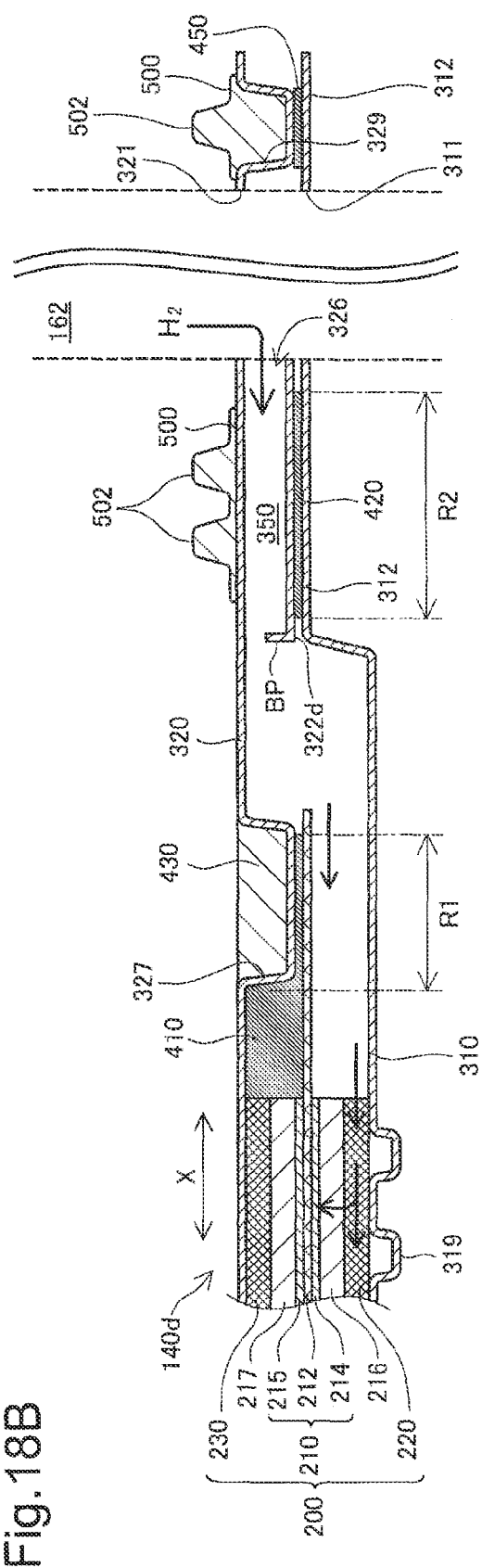

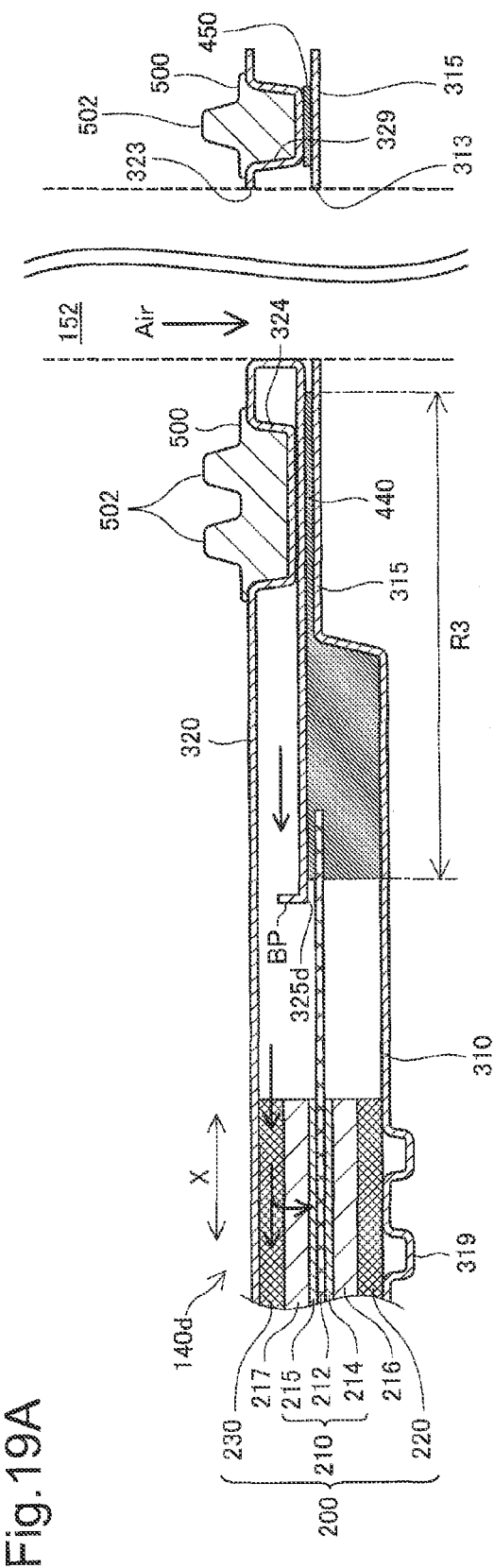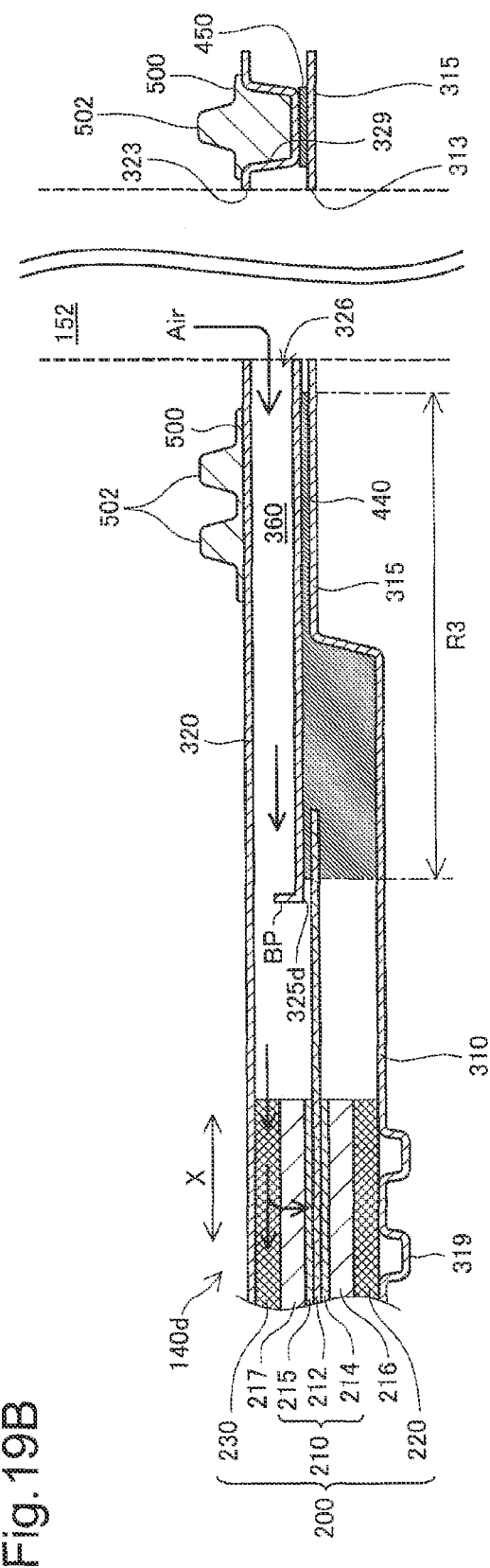

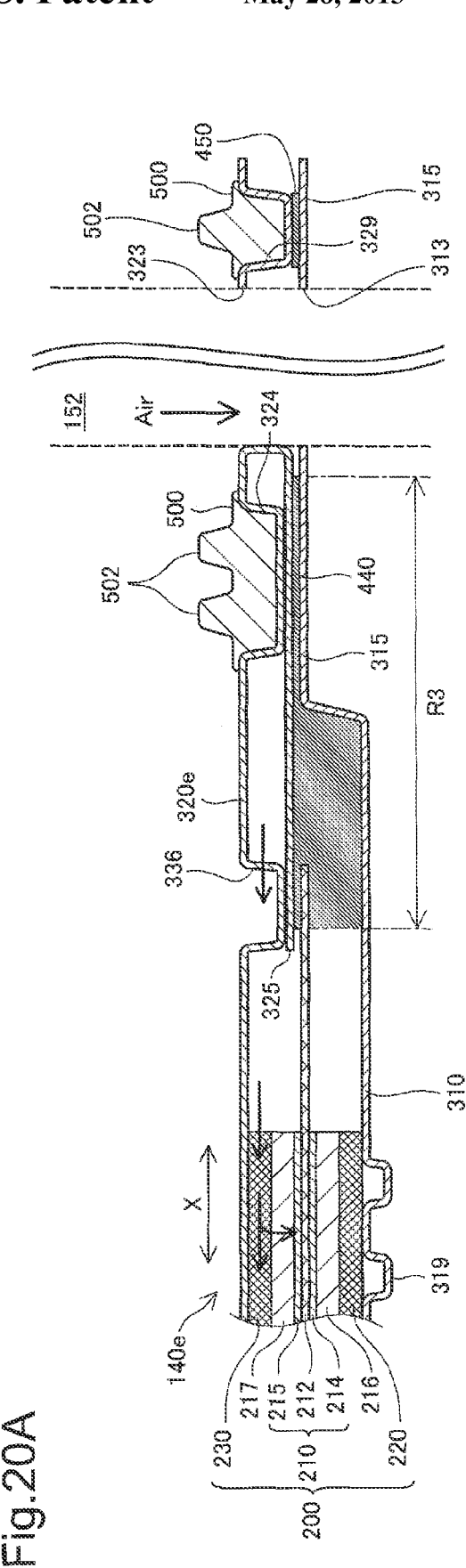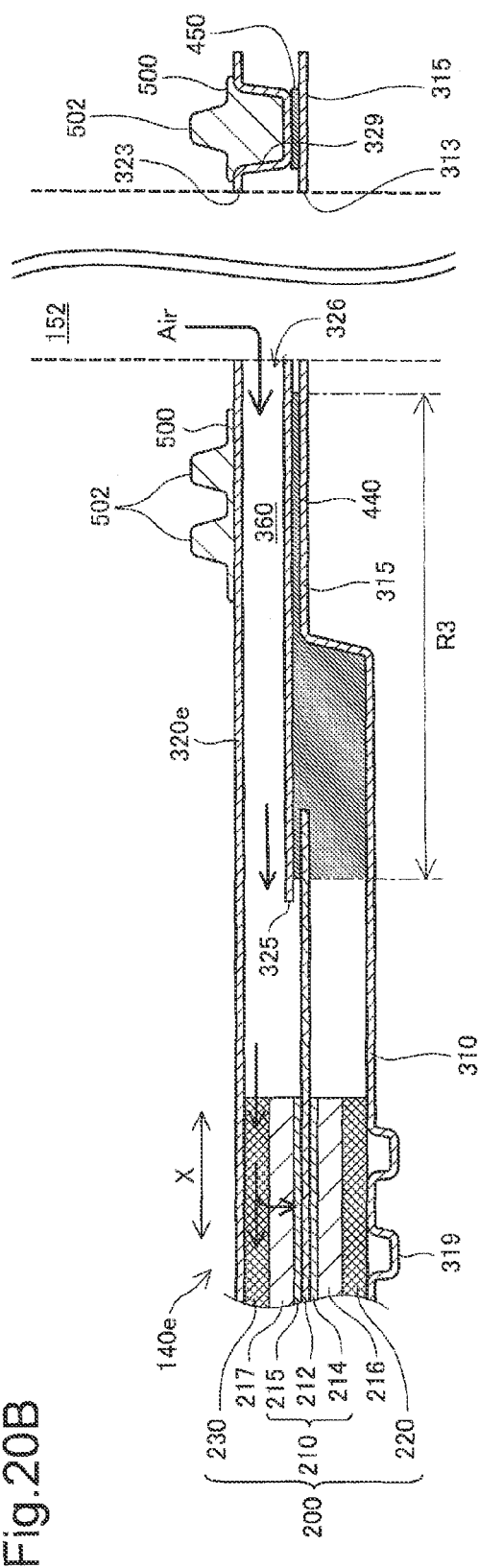

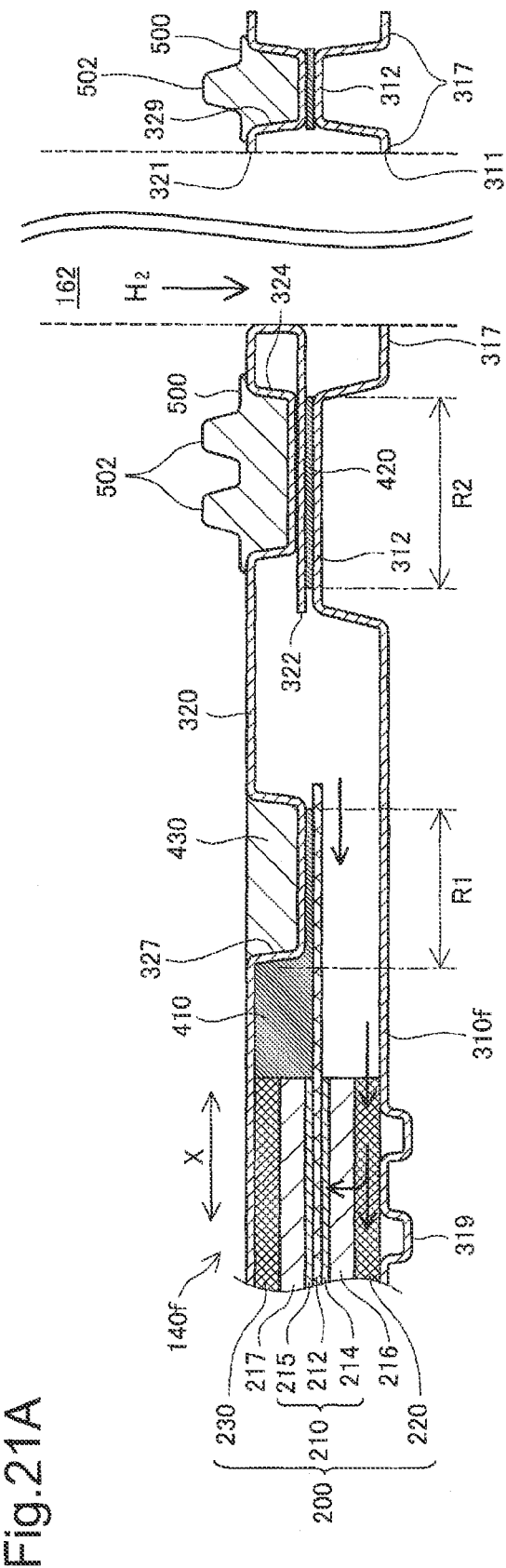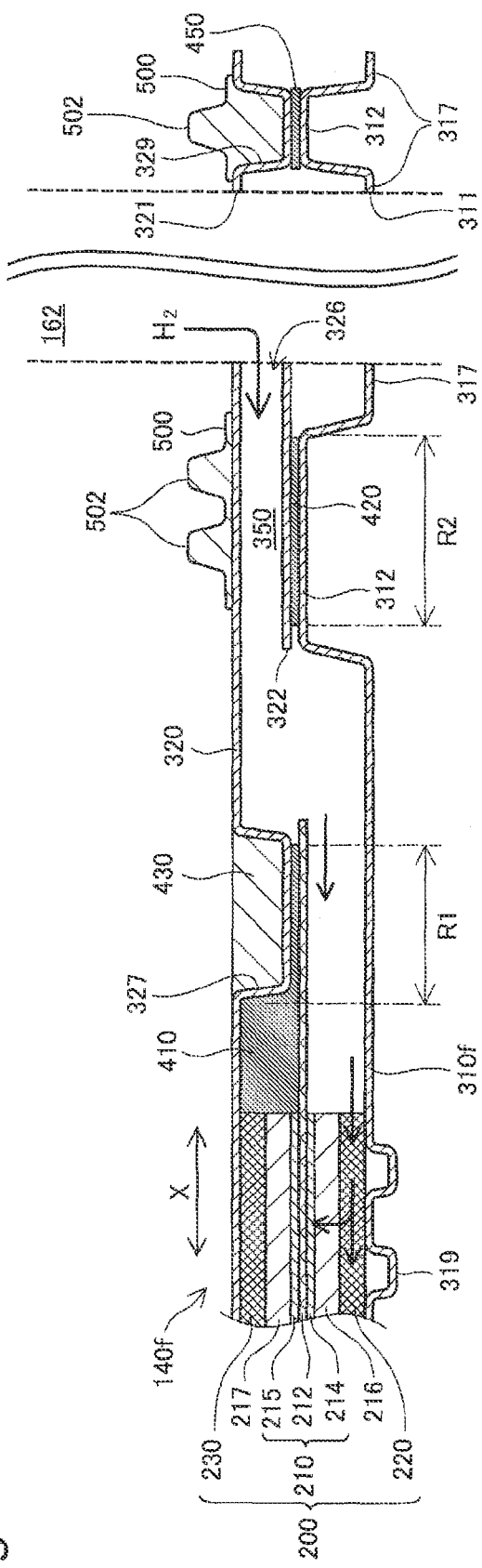

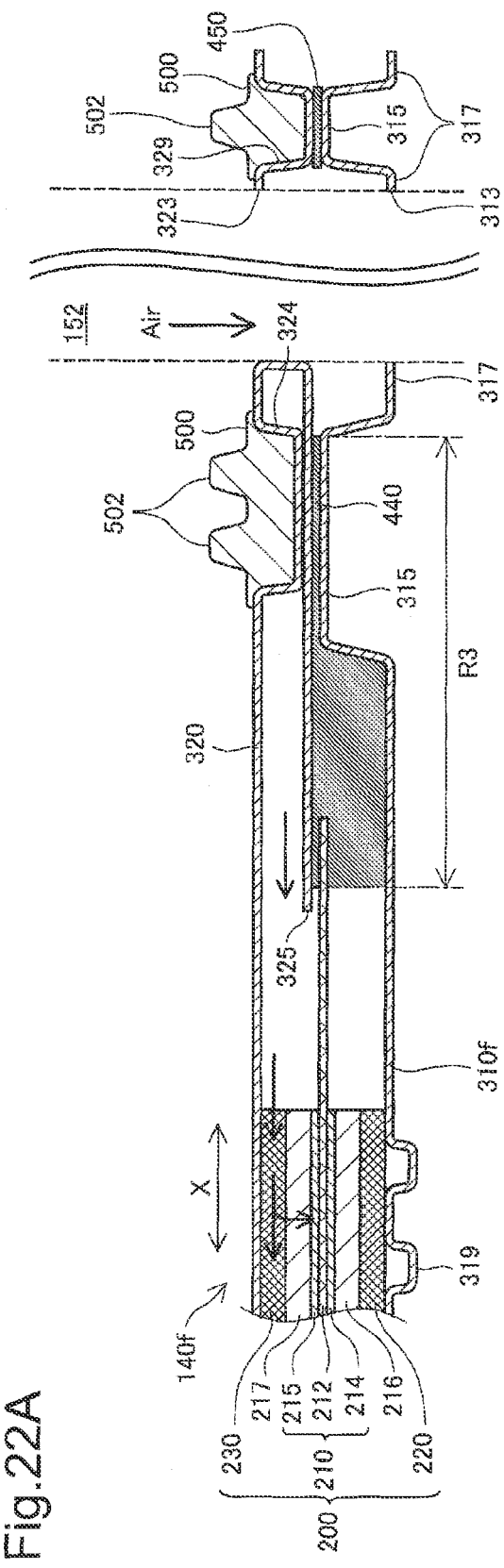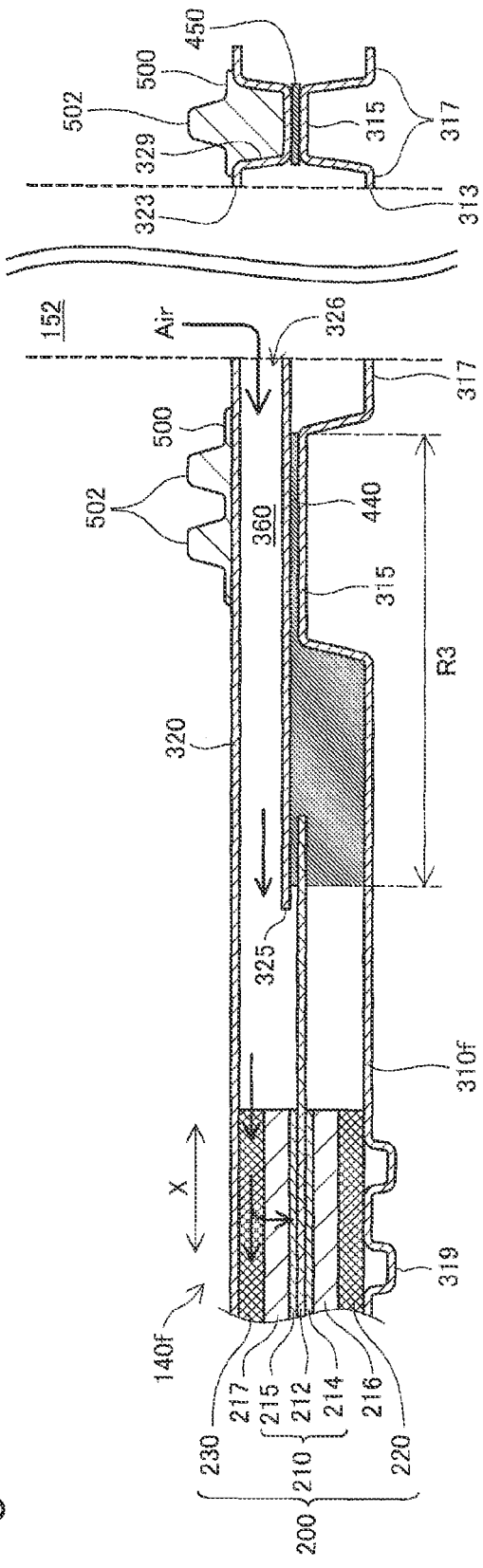

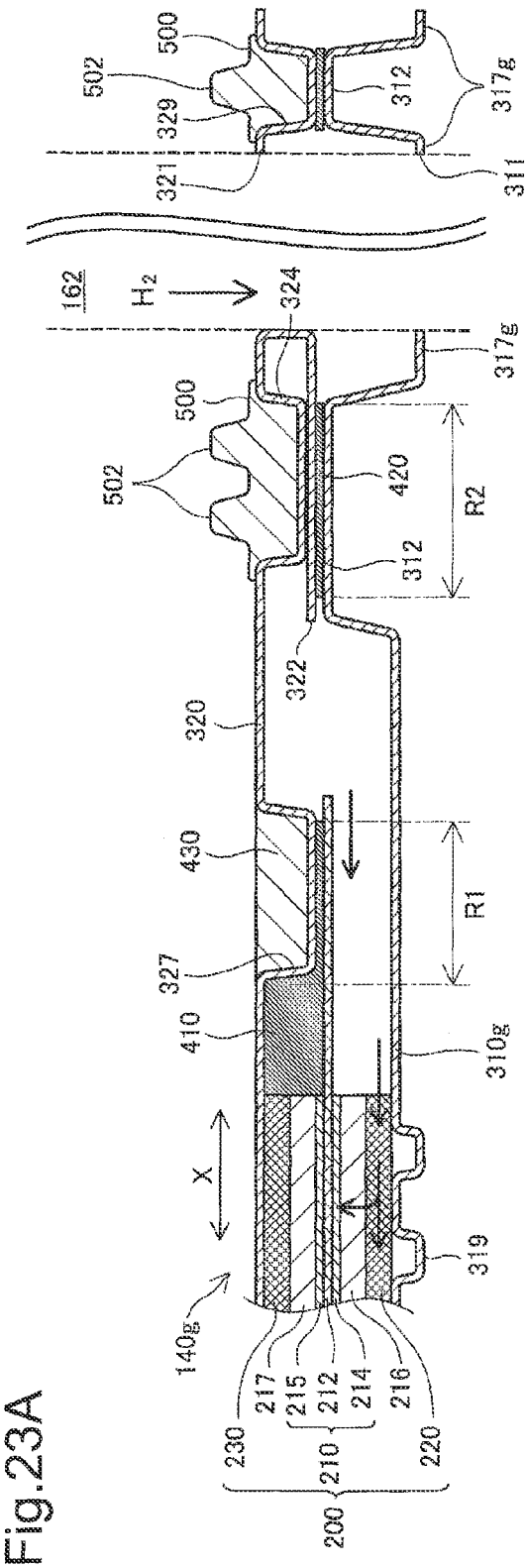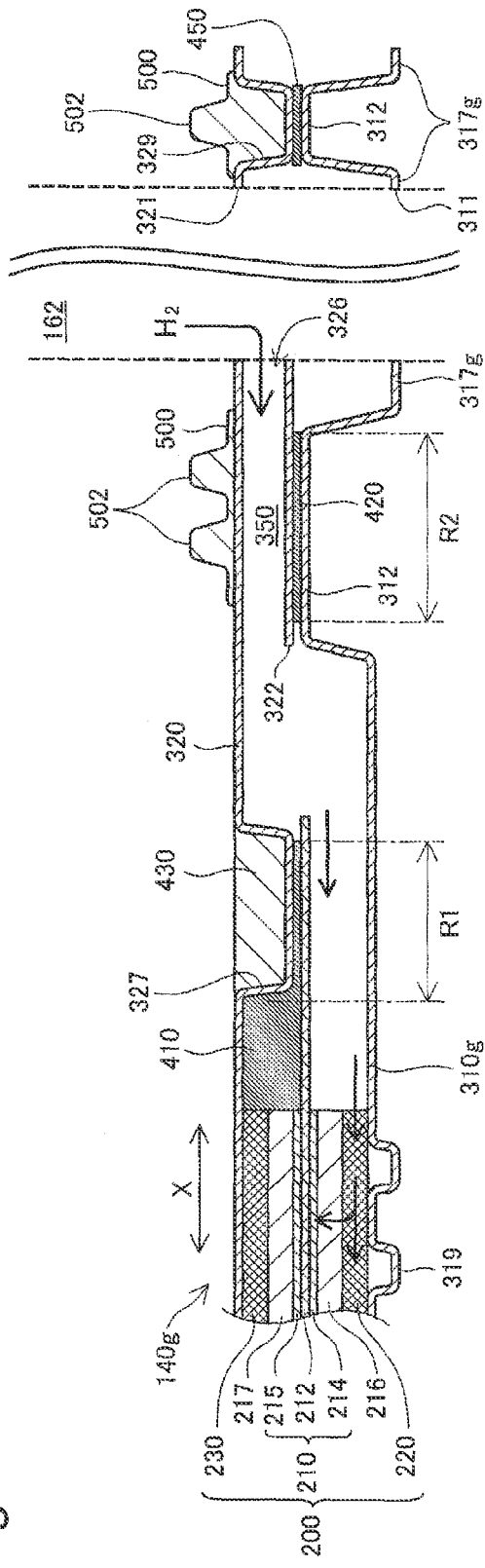

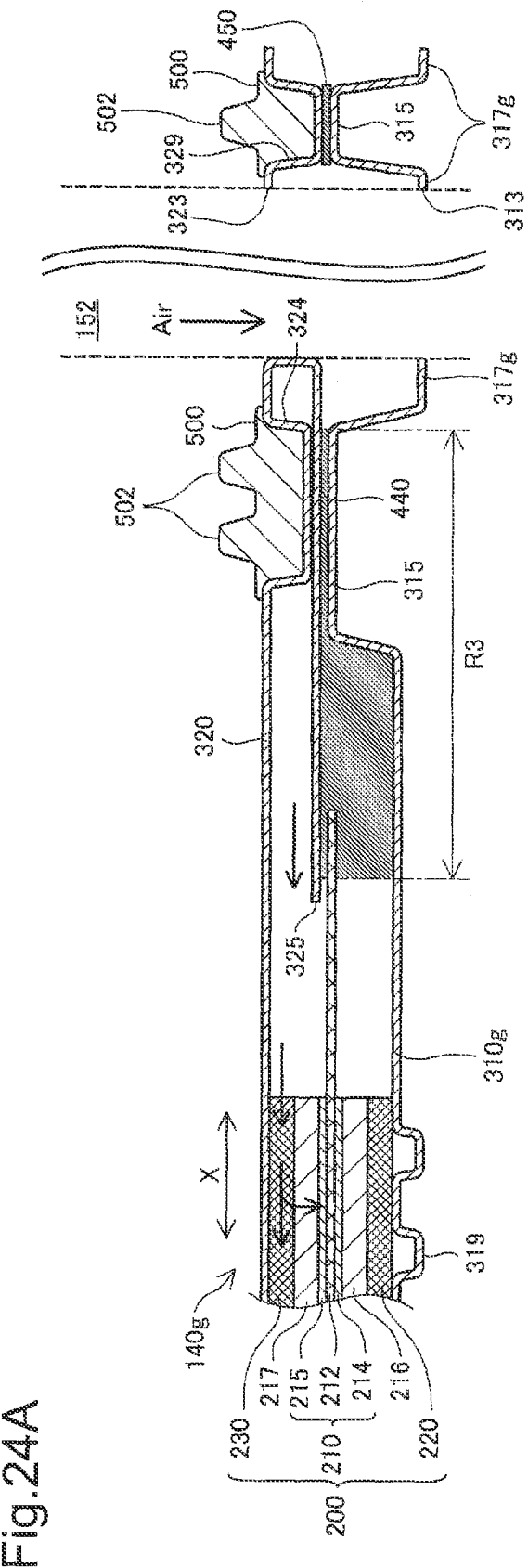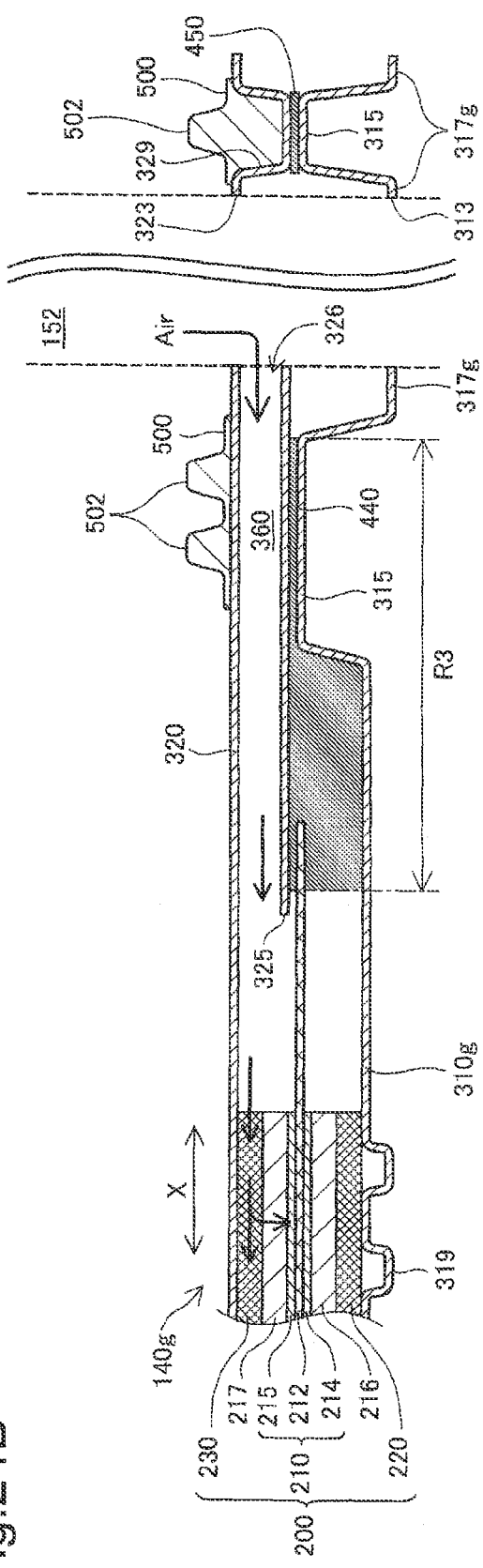

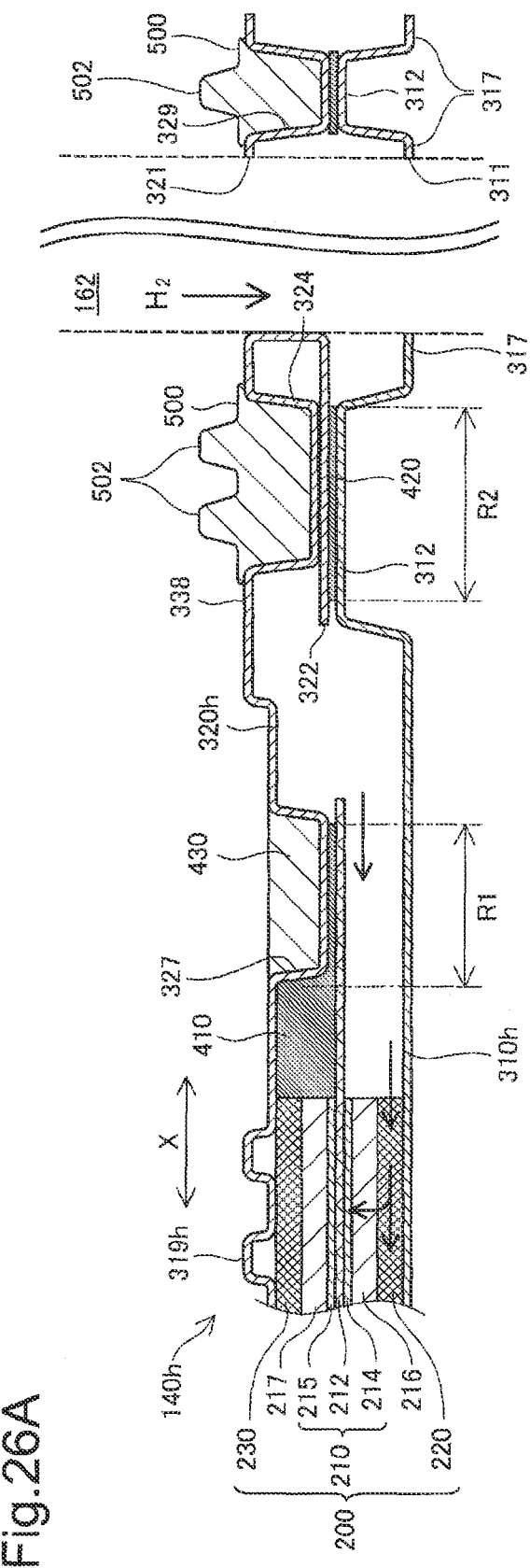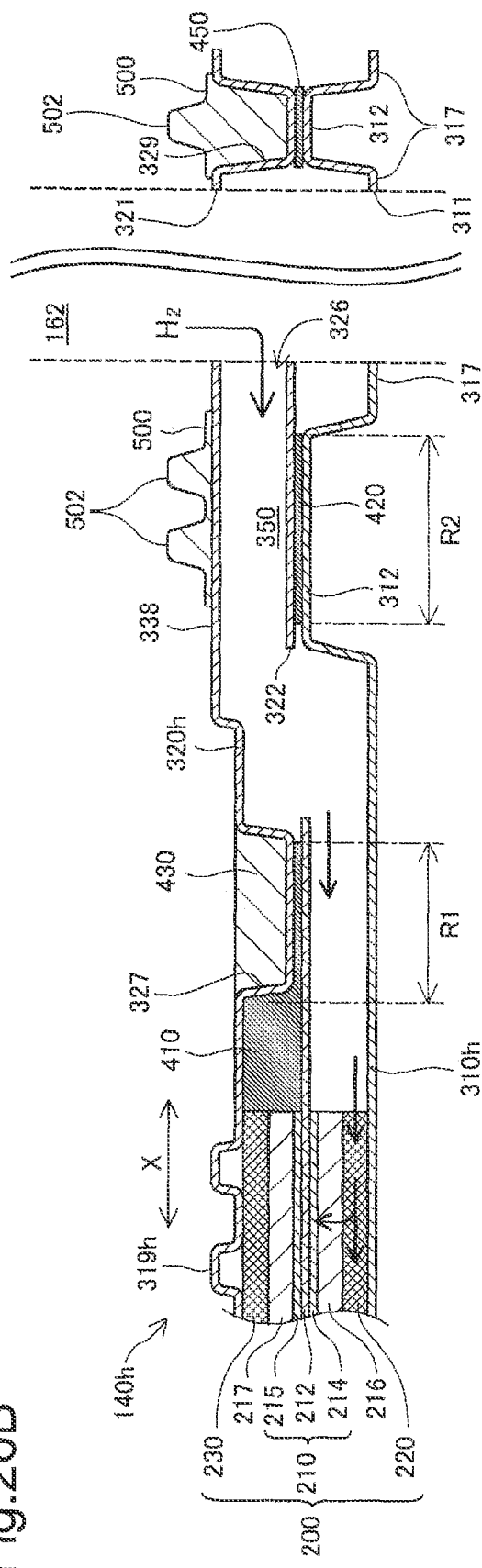

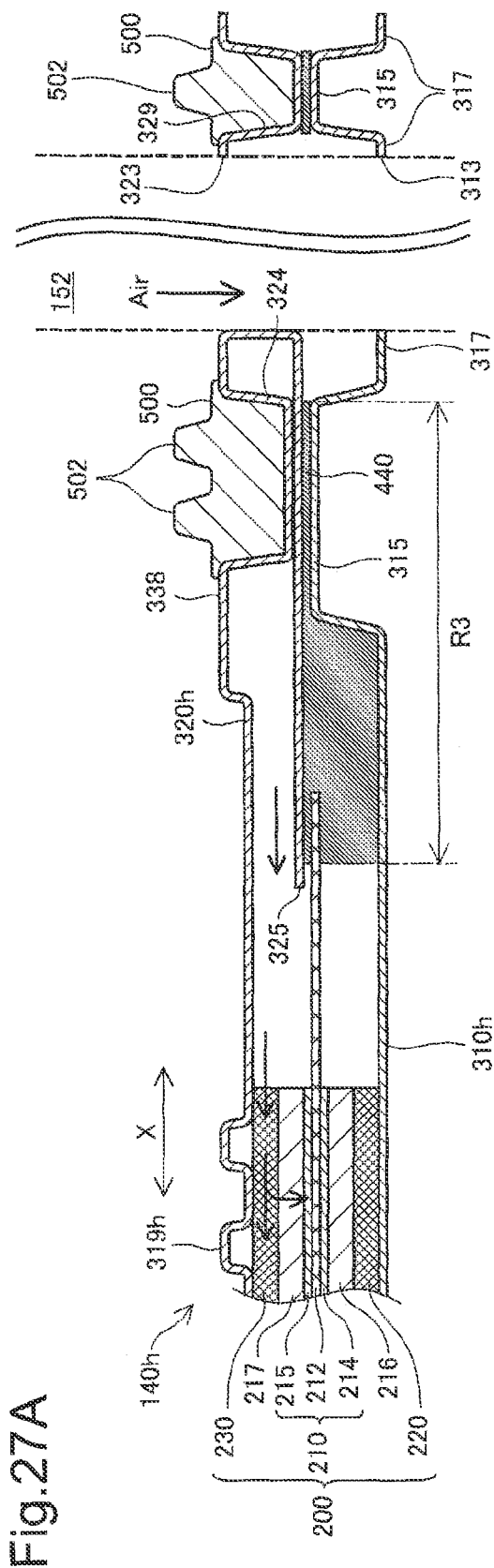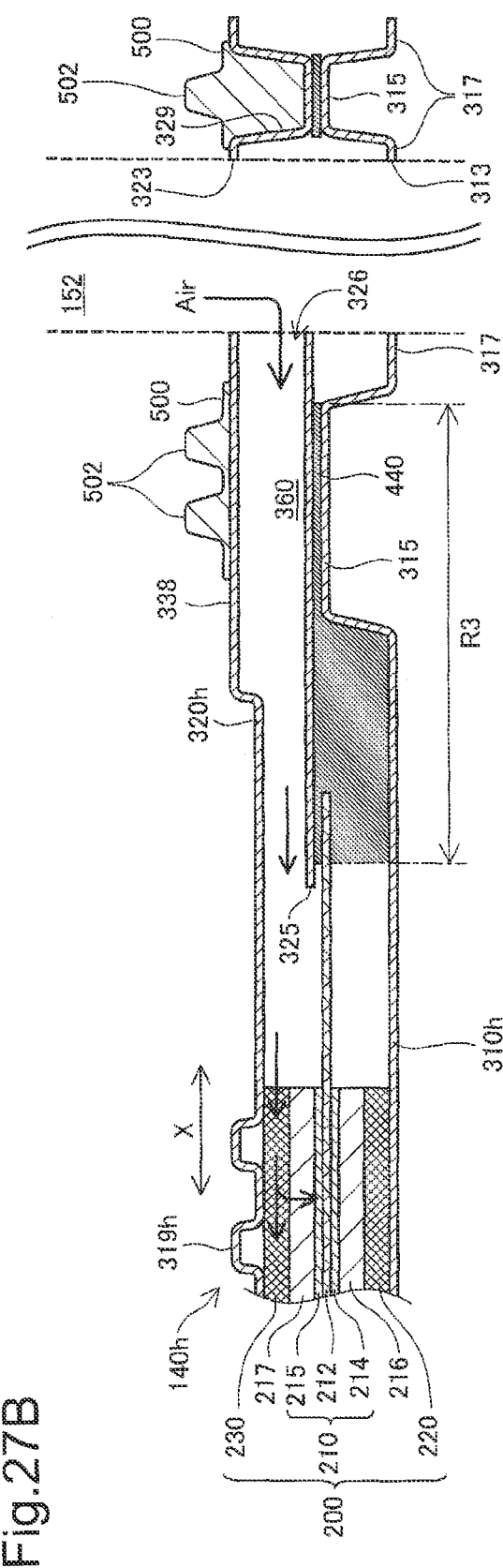

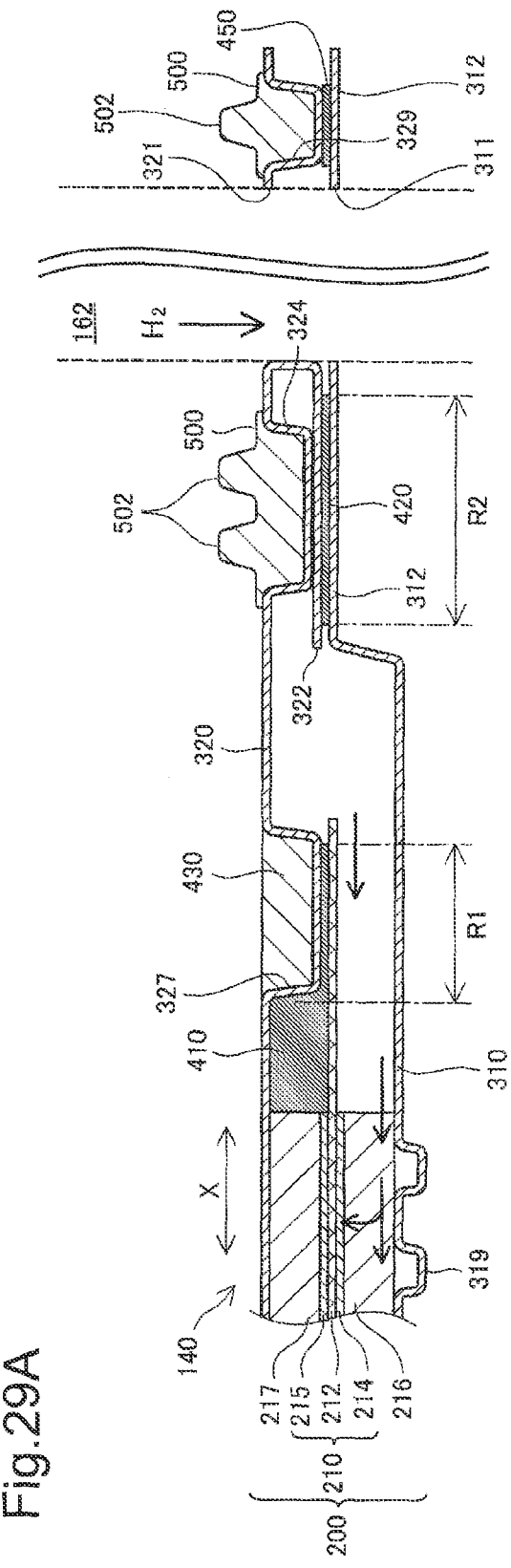
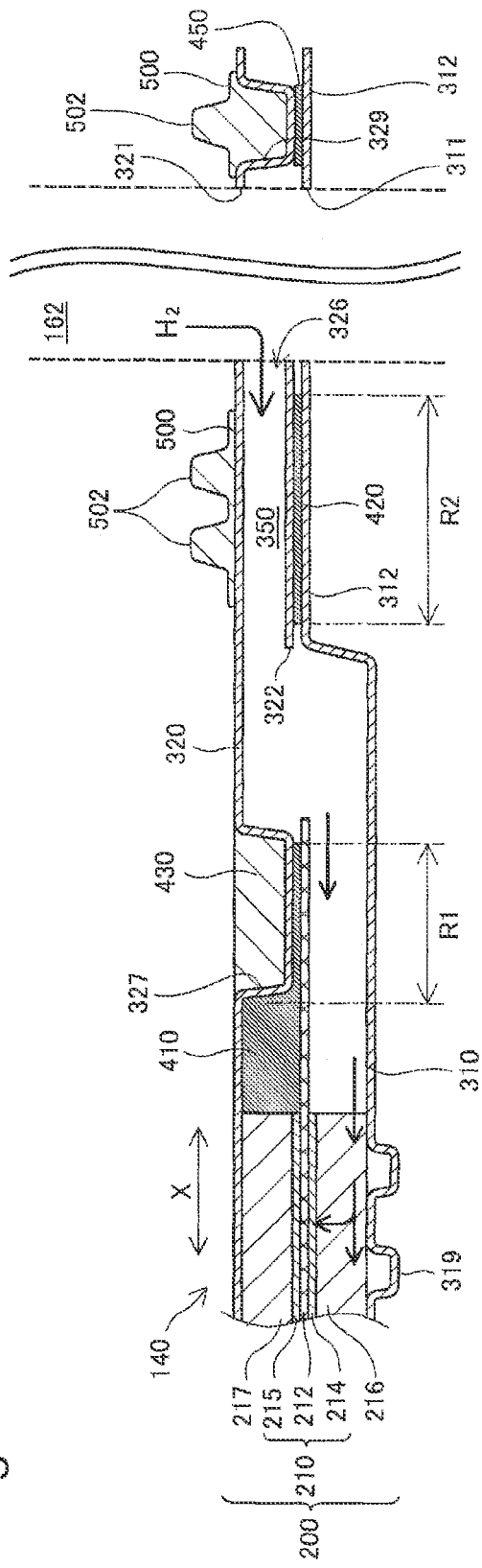
Fig.29A
Fig.29B

FUEL CELL HAVING A SEPARATOR WITH A FOLDED BACK PART

CROSS REFERENCE TO RELATED APPLICATIONS

This application is a National Stage of International Application No. PCT/W2009/006498 filed on Dec. 1, 2009, the contents of all of which are incorporated herein by reference in their entirety.

BACKGROUND

1. Technical Field

The present invention relates to a fuel cell.

2. Background Art

Fuel cells typically use a stacked constitution for which a power generating module, which includes a membrane electrode assembly of a constitution for which an anode is provided on one surface of an electrolyte membrane and a cathode is provided on the other surface, and separators are alternately stacked. The fuel cell converts chemical energy held by a substance directly to electrical energy by causing an electrochemical reaction using a reaction gas (fuel gas and oxidizing gas) supplied to the membrane electrode assembly. The reaction gas supplied to the fuel cell is led to the membrane electrode assembly via a manifold, and the reaction gas that is not used at the membrane electrode assembly is exhausted to a manifold. For the reaction gas lead-in part from the manifold to the membrane electrode assembly, and the lead-out part from the membrane electrode assembly to the manifold (hereafter collectively referred to as "reaction gas lead-in/out part"), there is a demand for both ensuring of a gas flow path and ensuring of gas sealing properties.

A constitution for the reaction gas lead-in/out part is known for which formation is achieved by the part at which the opening for the manifold is formed on the metal separator being folded back, and a communication hole being provided on the folded back part that allows communication of the manifold and an internal gas flow path space (e.g. see Reference 1).

Reference 1: JP2006-221905A

SUMMARY

With the prior art noted above, it is necessary to implement fold-back processing on both the anode side separator and the cathode side separator, so there is a tendency for there to be greater complexity of the processing steps as well as an increase in the size of the fuel cell along the stacking direction.

Considering the problem described above, there is a need to provide a fuel cell which achieves both ensuring of a gas flow path and ensuring of the gas sealing properties at the reaction gas lead-in/out part while suppressing greater complexity of the processing steps and an increase in the size of the fuel cell.

In order to address at least part of the problem described above, the present invention provides various aspects and embodiments described below.

Aspect 1: According to one aspect of the present invention, there is provided a fuel cell comprising: a membrane electrode assembly including an electrolyte membrane and electrode layers arranged on each surface of the electrolyte membrane respectively, and first and second separators that are formed by processing a metal plate and are arranged so as to sandwich the membrane electrode assembly, wherein at a position outside a position facing the membrane electrode assembly, the first and second separators have an opening that constitutes a reaction gas flow path that is roughly perpendicular to a surface direction that is parallel to a surface of the membrane electrode assembly, the first separator has a folded back part that is formed by folding back at least part of the metal plate of the position at which the opening is formed toward the membrane electrode assembly side along a boundary line on the membrane electrode assembly side of the opening as a fold line, the folded back part has a communication hole that allows communication between an internal flow path space and the reaction gas flow path, the internal flow path space being a space communicated with an end surface of the membrane electrode assembly and being formed between the folded back part and the first separator, and the second separator does not have the folded back part.

In the fuel cell according to the aspect 1, the first separator has a folded back part that is formed by folding back at least part of the metal plate of the position at which the opening is formed toward the membrane electrode assembly side along a boundary line on the membrane electrode assembly side of the opening as a fold line. An internal flow path space communicated with an end surface of the membrane electrode assembly is formed between the folded back part and the first separator. A communication hole that allows communication between the internal flow path space and the reaction gas flow path is formed on the folded back part. Because of that, with this fuel cell, it is possible to achieve both ensuring of the gas flow path and ensuring of the gas sealing properties at the reaction gas lead-in/out part. Also, the second separator does not have a folded back part. Because of that, with this fuel cell, it is possible to suppress greater complexity of the processing steps and an increase in the size of the fuel cell.

Aspect 2: In the fuel cell in accordance with the aspect 1, a sealant is placed between the folded back part of the first separator and the second separator.

In the fuel cell according to the aspect 2, compared to when sealing between the folded back part of the first separator and the membrane electrode assembly, it is possible to reduce the area of the membrane electrode assembly while achieving ensuring of the gas sealing properties at the reaction gas lead-in/out part.

Aspect 3: In the fuel cell in accordance with either one of the aspects 1 and 2, the length along the surface direction of a first folded back part which is the folded back part adjacent to the opening that constitutes the reaction gas flow path in which reaction gas used by the electrode of the first separator side of the membrane electrode assembly flows is longer than the length along the surface direction of a second folded back part which is the folded back part adjacent to the opening that constitutes the reaction gas flow path in which reaction gas used by the electrode of the second separator side of the membrane electrode assembly flows.

In the fuel cell according to the aspect 3, it is possible to reduce greatly the flow path resistance at the gas lead-in/out part for the reaction gas used by the electrode on the first separator side.

Aspect 4: In the fuel cell in accordance with the aspect 3, the length along the surface direction of the electrolyte membrane at a position facing the opening is longer than the length along the surface direction of the electrolyte layer, the length of the first folded back part is such length as the first folded back part overlaps the electrolyte membrane along the direction roughly perpendicular to the surface direction, and the length of the second folded back part is such length as the second folded back part does not overlap the electrolyte membrane along the direction roughly perpendicular to the surface direction.

In the fuel cell according to the aspect 4, it is possible to have the relation between the first folded back part and the electrolyte membrane be a relation whereby a good seal can be formed while ensuring communication between the internal flow path space formed by the second folded back part and the second separator side electrode.

Aspect 5: In the fuel cell in accordance with the aspect 4, a sealant is placed between the first folded back part of the first separator and the second separator, between the first folded back part of the first separator and the electrolyte membrane, between the second folded back part of the first separator and the second separator, and between a part of the first separator at a position farther from an edge of the first separator than the second folded back part and the electrolyte membrane, and positions of the sealants along the direction roughly perpendicular to the surface direction are the same.

In the fuel cell according to the aspect 5, by having the position along the direction roughly perpendicular to the surface direction of the sealants be the same, it is possible to make the fuel cell manufacturing process simpler and to reduce costs.

Aspect 6: In the fuel cell in accordance with any one of the aspects 1 through 5, the fuel cell further comprises a gas diffusion layer arranged between the membrane electrode assembly and the first separator and between the membrane electrode assembly and the second separator, and the length along the surface direction of the gas diffusion layer of the first separator side is shorter than the length along the surface direction of the gas diffusion layer of the second separator side and than the length along the surface direction of the electrolyte membrane.

In the fuel cell according to the aspect 6, by arranging at the electrolyte membrane a second separator side gas diffusion layer at least at part of the part for which a first separator side gas diffusion layer is not arranged, the concerned part of the electrolyte membrane is reinforced, and it is possible to suppress the occurrence of cross leak due to breakage of the electrolyte membrane, and it is also possible to suppress the occurrence of shorts by direct contact of the gas diffusion layers of both sides.

Aspect 7: In the fuel cell in accordance with any one of the aspects 1 through 6, at a position facing the folded back part of the first separator, a plurality of first convex parts aligned along a direction roughly parallel to the fold line are formed by press working of the metal plate, each of the first convex parts having a convex shape along a direction from the first separator to the second separator.

In the fuel cell according to the aspect 7, the plurality of first convex parts aligned along the direction roughly parallel to the fold line project in the internal fuel path space formed by the folded back part, so it is possible to improve the gas distribution properties at the reaction gas lead-in/out part.

Aspect 8: In the fuel cell in accordance with the aspect 7, each of the plurality of first convex parts is divided into parts by a flat shaped flat part provided at a plurality of positions aligned along a direction from the opening to the membrane electrode assembly, and on the flat part are arranged a gasket for sealing the opening enclosing in the surface direction, and a gasket for sealing an outer periphery of the fuel cell enclosing in the surface direction.

In the fuel cell according to the aspect 8, it is possible to have the reaction force at the seal line of the gasket be the same in-plane, and in addition to being able to suppress reaction gas leaks, it is also possible to suppress the occurrence of partial degradation of the gasket or deformation of the separator.

Aspect 9: In the fuel cell in accordance with any one of the aspects 1 through 8, the folded back part has at a tip position a tip side folded back part that is folded toward the first separator.

In the fuel cell according to the aspect 9, it is possible to suppress deformation of the folded back part formed on the first separator toward the second separator side due to springback function, so it is possible to suppress the occurrence of shorting due to contact of both separators.

Aspect 10: In the fuel cell in accordance with the aspect 9, the tip side folded back part is of a shape for which a tip of the tip side folded back part reaches a surface of the first separator, and has a communication hole for allowing gas to pass through.

In the fuel cell according to the aspect 10, it is possible to effectively suppress deformation of the folded back part toward the second separator side due to spring-back function while ensuring a reaction gas flow path between the internal flow path space formed by the folded back part and the membrane electrode assembly.

Aspect 11: In the fuel cell in accordance with any one of the aspects 1 through 10, at an end part of the second separator along the surface direction is formed an end part folded back part that is folded in a direction separating from the first separator.

In the fuel cell according to the aspect 11, the end part folded back part is formed folded back in the direction separating from the first separator at the end part of the second separator along the surface direction, so the distance between separators is larger, the occurrence of shorting between separators is suppressed, and also, the bending strength at the end part is improved, and bending deformation of the end part is suppressed.

Aspect 12: In the fuel cell in accordance with the aspect 12, at a tip position of the end part folded back part of the second separator is formed an end part parallel part which is roughly parallel to the surface direction and for which a position along the direction roughly perpendicular to the surface direction is the same as a position of a part furthest separated from the first separator other than the end part folded back part of the second separator.

In the fuel cell according to the aspect 12, an end part parallel part is formed at the tip position of the end part folded, back part of the second separator, and the position along the direction roughly perpendicular to the surface direction of the end part parallel part is the same as the position of the part furthest separated from the first separator other than the end part folded back part of the second separator, so as a jig of the second separator side used for a thermal compression processing of the fuel cell, it is possible to use a flat shaped jig which has good surface position precision and for which the occurrence of internal distortion and warpage is suppressed, and as a result, it is possible to improve the precision of the fuel cell.

Aspect 13: In the fuel cell in accordance with the aspect 12, the second separator has at a position facing the membrane electrode assembly a plurality of second convex parts for ensuring a space for cooling medium flow between the second convex part and the first separator that is adjacent the second convex part along a direction roughly perpendicular to the surface direction without intervention of the membrane electrode assembly, and the part that is furthest separated from the first separator other than the end part folded back part at the second separator is the furthest outside part of the second convex part.

In the fuel cell according to the aspect 13, a space for cooling medium flow is formed between the second separator and the first separator by the second convex part formed on the second separator, and also, as a jig of the second separator side used for a thermal compression processing of the fuel cell, it is possible to use a flat shaped jig with good surface position precision and for which the occurrence of internal distortion and warpage is suppressed, and it is possible to improve the precision of the fuel cell.

Aspect 14: In the fuel cell in accordance with the aspect 12, the first separator has at a position facing the membrane electrode assembly a plurality of second convex parts for ensuring a space for cooling medium flow between the second convex part and the second separator that is adjacent the second convex part along a direction roughly perpendicular to the surface direction without intervention of the membrane electrode assembly, and at a position facing the folded back part of the first separator is formed a third convex part for which a position along the direction roughly perpendicular to the surface direction is the same as a position of the furthest outside part of the second convex part.

In the fuel cell according to the aspect 14, a space for cooling medium flow is formed between the second separator and the first separator by the second convex part formed on the first separator, and also, as the jig of the first separator side and second separator side used for a thermal compression processing of the fuel cell, it is possible to use a flat shaped jig which has good surface position precision, and for which the occurrence of internal distortion and warpage is suppressed, and as a result, it is possible to improve the precision of the fuel cell.

Aspect 15: In the fuel cell in accordance with the aspect 11, a sealant is positioned between a part other than the end part folded back part of an end part of the second separator along the surface direction and the first separator.

In the fuel cell according to the aspect 15, because an end part folded back part is formed at the end, part of the second separator, a sealant buffer space is ensured at the sealing location between the second separator and the first separator, and even when a sufficient amount of sealant is arranged between separators, there is no need for the work of removing protruding sealant, and it is possible to effectively suppress the occurrence of shorting between the separators while suppressing increased complexity of the work processes.

Aspect 16: In the fuel cell in accordance with any one of the aspects 1 through 15, the fuel cell comprises a gas diffusion layer arranged between the membrane electrode assembly and the first separator and between the membrane electrode assembly and the second separator, and a pair of porous body flow path layers formed using a porous body for supplying reaction gas to the gas diffusion layer arranged between the respective gas diffusion layers and the respective first and second separators.

The present invention may be implemented by diversity of aspects, for example, a fuel cell, a separator for fuel cell, a fuel cell system, and a method for manufacturing these apparatuses and systems.

BRIEF DESCRIPTION OF THE DRAWINGS

FIG. 4A and FIG. 4B are explanatory drawings showing the cross section constitution of the unit cell 140;

FIG. 5A and FIG. 5B are explanatory drawings showing the cross section constitution of the unit cell 140;

FIG. 11A and FIG. 11B are explanatory drawings showing the cross sectional constitution of the unit cell 140a of the second embodiment;

FIG. 12A and FIG. 12B are explanatory drawings showing the cross sectional constitution of the unit cell 140a of the second embodiment;

FIG. 14A and FIG. 14B are explanatory drawings showing the cross section constitution of the unit cell 140b constituting the fuel cell 100 of the third embodiment;

FIG. 16A and FIG. 16B are explanatory drawings showing the cross section constitution of the unit cell 140c constituting the fuel cell 100 of a fourth embodiment;

FIG. 17A and FIG. 17B are explanatory drawings showing the cross section constitution of the unit cell 140c constituting the fuel cell 100 of a fourth embodiment;

FIG. 18A and FIG. 18B are explanatory drawings showing the cross section constitution of the unit sell 140d constituting the fuel cell 100 of the fifth embodiment;

FIG. 19A and FIG. 19B are explanatory drawings showing the cross section constitution of the unit sell 140d constituting the fuel cell 100 of the fifth embodiment;

FIG. 20A and FIG. 20B are explanatory drawings showing the cross section constitution of the unit cell 140e constituting the fuel cell 100 of the sixth embodiment;

FIG. 21A and FIG. 21B are explanatory drawings showing the cross section constitution of the unit cell 140f constituting the fuel cell 100 of the seventh embodiment;

FIG. 22A and FIG. 22B are explanatory drawings showing the cross section constitution of the unit cell 140f constituting the fuel cell 100 of the seventh embodiment;

FIG. 23A and FIG. 23B are explanatory drawings showing the cross section constitution of the unit cell 140g constituting the fuel cell 100 of the eighth embodiment;

FIG. 24A and FIG. 24B are explanatory drawings showing the cross section constitution of the unit cell 140g constituting the fuel cell 100 of the eighth embodiment;

FIG. 26A and FIG. 26B are explanatory drawings showing the cross section constitution of the unit cell 140h constituting the fuel cell 100 of the ninth embodiment;

FIG. 27A and FIG. 27B are explanatory drawings showing the cross section constitution of the unit cell 140h constituting the fuel cell 100 of the ninth embodiment;

FIG. 29A and FIG. 29B are explanatory drawings showing the cross section constitution of the unit cell constituting the fuel cell of the modification.

DESCRIPTION OF THE EMBODIMENT

The embodiments of the present invention are described below.

Figure 1:
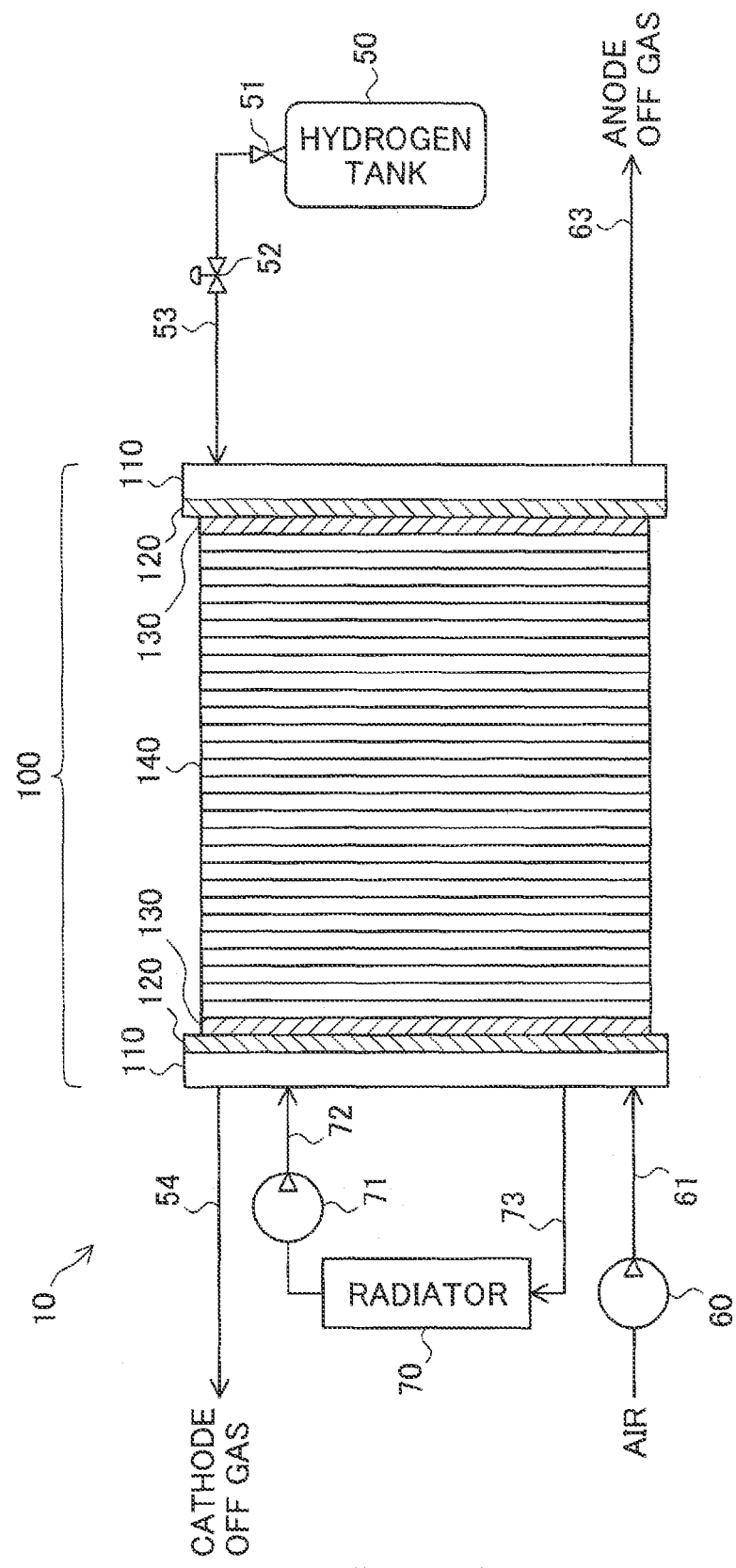
FIG. 1 is an explanatory drawing showing the schematic structure of a fuel cell system 10 of a first embodiment of the present invention.

A. First Embodiment:

FIG. 1 is an explanatory drawing showing the schematic structure of a fuel cell system 10 of a first embodiment of the present invention. The fuel cell system 10 includes a fuel cell 100. The fuel cell 100 has a stacked constitution for which an end plate 110, an insulation plate 120, a collector plate 130, a plurality of unit cells 140, a collector plate 130, an insulation plate 120, and an end plate 110 are stacked in this order.

Hydrogen is supplied as the fuel gas to the fuel cell 100 from a hydrogen tank 50 in which high pressure hydrogen is stored via a stop valve 51, a regulator 52, and piping 53. Fuel gas that is not consumed by the fuel cell 100 (anode off gas) is exhausted to outside the fuel cell 100 via exhaust piping 63. Note that the fuel cell system 10 may also have a recirculation mechanism that recirculates the anode off gas to the piping 53. Also, air is supplied as the oxidant gas to the fuel cell 100 via an air pump 60 and piping 61. The oxidant gas that is not consumed by the fuel cell 100 (cathode off gas) is exhausted to outside the fuel cell 100 via the exhaust piping 54. Note that the fuel gas and oxidant gas are also called reaction gas.

Also, to cool the fuel cell 100, a cooling medium cooled by a radiator 70 is supplied to the fuel cell 100 via a water pump 71 and piping 72. The cooling medium discharged from the fuel cell 100 is circulated in the radiator 70 via piping 73. As a cooling medium, for example water, a non-freezing solution such as ethylene glycol, air or the like can be used.

Figure 2:
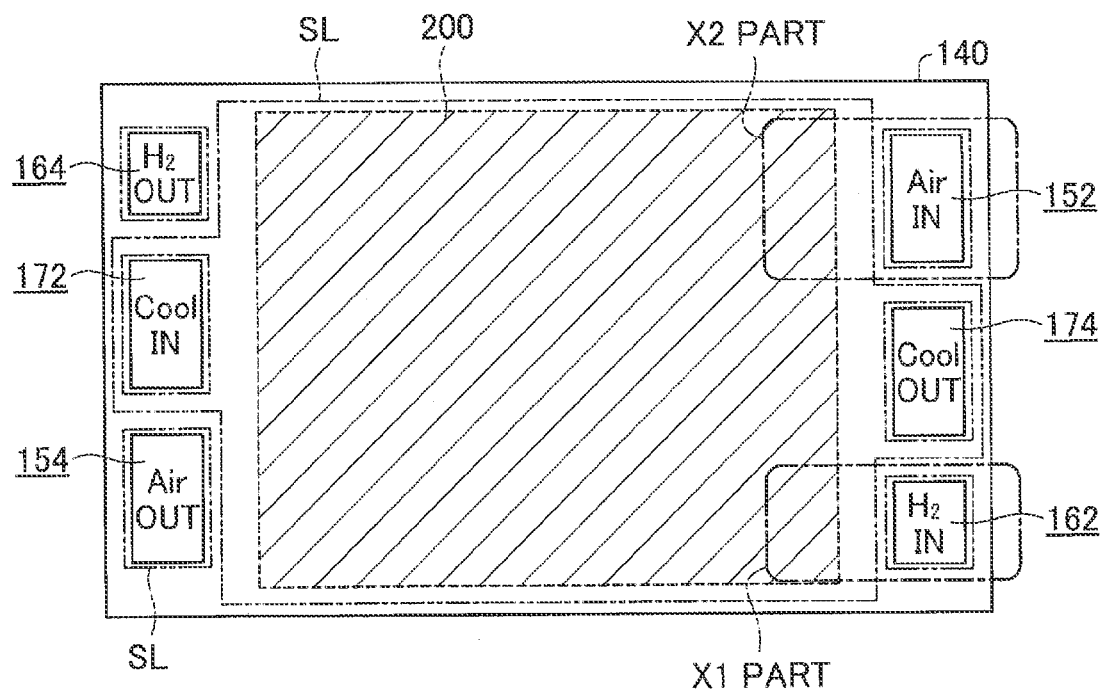
FIG. 2 is an explanatory drawing showing the planar constitution, of a unit cell 140 of the fuel cell 100.

FIG. 2 is an explanatory drawing showing the planar constitution of a unit cell 140 of the fuel cell 100. As will be described, later, the constitution of the unit cell 140 is such that a power generating module including a membrane electrode assembly (also called MEA) for which an anode and cathode are respectively arranged on each surface of the electrolyte membrane is sandwiched by a pair of separators.

As shown in FIG. 2, formed in the interior of the fuel cell 100 are a fuel gas supply manifold 162 which distributes to each unit cell 140 hydrogen as the fuel gas supplied to the fuel cell 100, an oxidizing gas supply manifold 152 which distributes to each unit cell 140 air as the oxidizing gas supplied to the fuel cell 100, a fuel gas exhaust manifold 164 which consolidates the fuel gas not consumed in each unit cell 140 and exhausts it to outside the fuel cell 100, and an oxidizing gas exhaust manifold 154 which consolidates the oxidizing gas not consumed in each unit cell 140 and exhausts it to outside the fuel cell 100. Each of the aforementioned manifolds is a reaction gas flow path of a shape that extends in the stacking direction of the fuel cell 100 (specifically, the direction roughly perpendicular to the surface direction that is parallel to a surface of the membrane electrode assembly). On the interior of the fuel cell 100, there are also formed a cooling medium supply manifold 172 which distributes cooling medium to the unit cell 140, and a cooling medium discharge manifold 174 which consolidates the cooling medium discharged from each unit cell 140 and exhausts it to outside the flag cell 100.

Figure 3A:
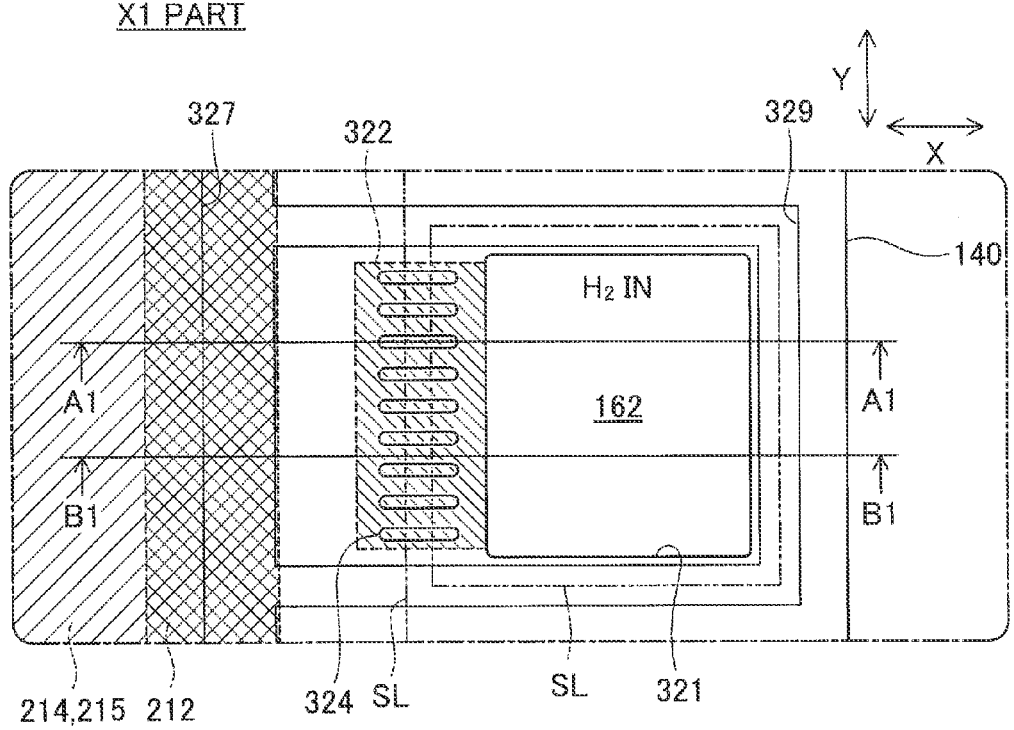
FIG. 3A and FIG. 3B are explanatory drawings showing in more detail the planar constitution of the unit cell 140.
Figure 3B:
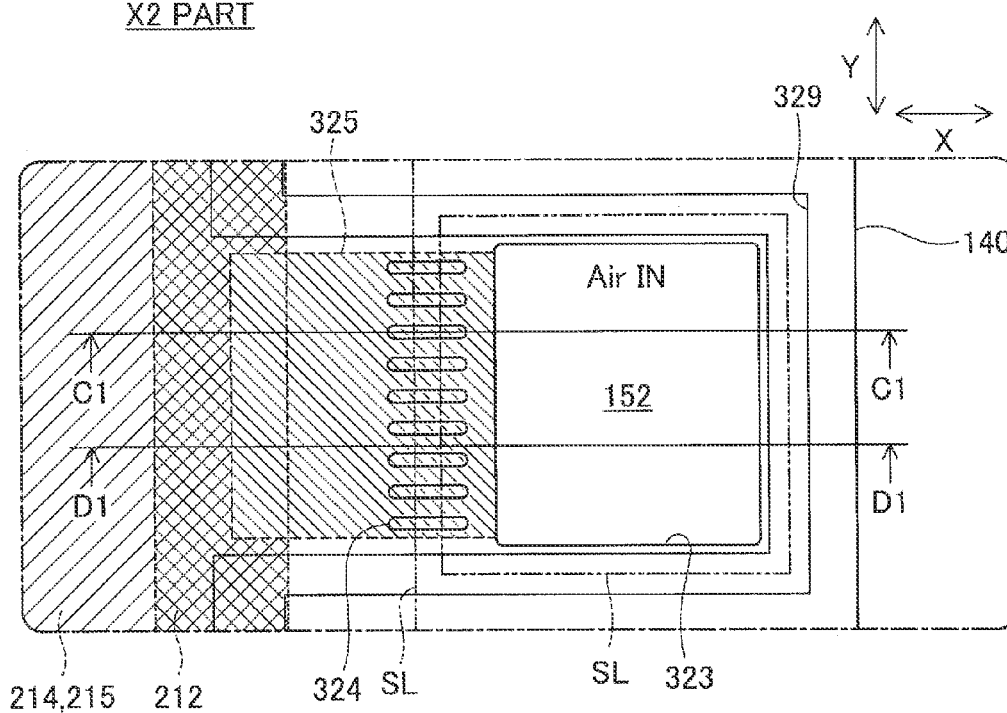

FIGS. 3A and 3B are explanatory drawings showing in more detail the planar constitution of the unit cell 140. FIG. 3A shows the planar constitution of the part (X1 part in FIG. 2) near the fuel gas supply manifold 162 of the unit cell 140, and FIG. 3B shows the planar constitution of the part (X2 part in FIG. 2) near the oxidizing gas supply manifold 152 of the unit cell 140. FIG. 4A, FIG. 4B, FIG. 5A and FIG. 5B are explanatory drawings showing the cross section constitution of the unit cell 140. FIG. 4A shows the A1-A1 cross section of FIG. 3A, FIG. 4B shows the B1-B1 cross section of FIG. 3A, FIG. 5A shows the C1-C1 cross section of FIG. 3B, and FIG. 5B shown the D1-D1 cross section of FIG. 3B.

As shown in FIG. 4A through FIG. 5B, the unit cell 140 has a power generating module 200 and a pair of separators that sandwich the power generating module 200 (cathode side separator 320 and anode side separator 310). The power generating module 200 has a constitution for which a cathode side porous body flow path layer 230, a cathode side diffusion layer 217, a membrane electrode assembly 210, an anode side diffusion layer 216, and an anode side porous body flow path layer 220 are stacked in this order. The membrane electrode assembly 210 is constituted from an electrolyte membrane 212, a cathode 215 arranged (coated) on one side of the electrolyte membrane 212, and an anode 214 arranged (coated) on the other side of the electrolyte membrane 212. In FIG. 2, the position of the power generating module 200 on the plane of the unit cell 140 is shown using cross hatching.

The electrolyte membrane 212 is a solid polymer membrane formed using a fluorine resin material or a hydrocarbon resin material, and has good proton conductivity in a humid state. The cathode 215 and the anode 214 include as the catalyst, for example, platinum or an alloy consisting of platinum and another metal. The cathode side diffusion layer 217 and the anode side diffusion layer 216 are for example formed by carbon cloth woven with thread consisting of carbon fiber, or carbon paper or carbon felt. The cathode side porous body flow path layer 230 and the anode side porous body flow path layer 220 are formed with a porous material having gas diffusion properties and conductivity such as a metal porous body or the like. The cathode side porous body flow path layer 230 and the anode side porous body flow path layer 220 have a higher porosity than the cathode side diffusion layer 217 and the anode side diffusion layer 216, so the flow resistance of gas on the interior is low, and this functions as a flow path for flowing reaction gas.

Note that with the description, a direction in which each layer of the power generating module 200 is stacked is simply called the "stacking direction", and a direction parallel to a surface of the membrane electrode assembly 210 (i.e., a direction roughly perpendicular to the stacking direction) is simply called the "surface direction". Also, among the surface directions, the direction parallel to the outer periphery side of each layer of the power generating module 200 closest to the fuel gas supply manifold 162 and the oxidizing gas supply manifold 152 is called the Y direction, and the surface direction roughly perpendicular to the Y direction is called the X direction (see FIG. 3A through FIG. 5B).

As shown in FIG. 4A through FIG. 5B, at the position facing the fuel gas supply manifold 162 and the oxidizing gas supply manifold 152, the length along the X direction of the electrolyte membrane 212 is longer than the length of the other layers constituting the power generating module 200 (e.g. anode 214 and cathode 215). Thus, when viewing the power generating module 200 from the stacking direction of the fuel cell 100, the electrolyte membrane 212 projects in the X direction from the other layers. In FIGS. 3A and 3B, the positions of the electrolyte membrane 212 and other layers (e.g. anode 214 and cathode 215) on the plane of the unit cell 140 are shown by hatching. At the projecting part of the electrolyte membrane 212, to improve durability and handling, it is also possible to provide a protective layer using PEN or the like.

The cathode side separator 320 and the anode side separator 310 are formed by processing a metal plate. On the cathode side separator 320, at a position further outside along the surface direction than the position facing the membrane electrode assembly 210, as shown in FIG. 4A and FIG. 4B, an opening 321 that constitutes the fuel gas supply manifold 162 is formed, and as shown in FIG. 5A and FIG. 5B, an opening 323 that constitutes the oxidizing gas supply manifold 152 is formed.

Figure 6:
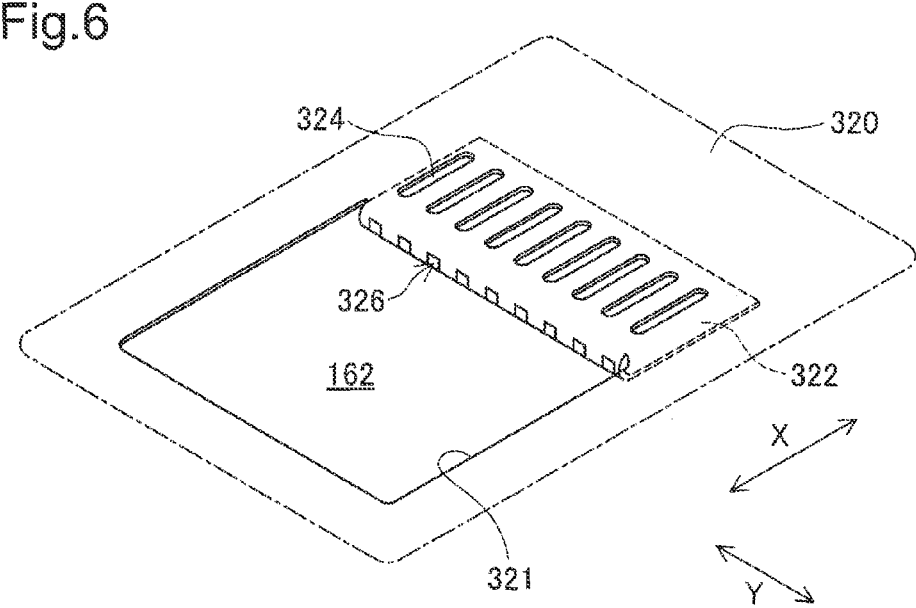
FIG. 6 is a perspective view showing the constitution near the opening 321 of the cathode side separator 320.

FIG. 6 is a perspective view showing the constitution near the opening 321 of the cathode side separator 320. As shown in FIG. 4A, FIG. 4B and FIG. 6, a folded back part 322 is formed at the position adjacent to the opening 321 for constituting the fuel gas supply manifold 162 of the cathode side separator 320. The folded back part 322, as will be described in detail later, is formed by folding back at least part of a metal plate as the material of the cathode side separator 320 of the position at which the opening 321 is formed along a boundary line on the membrane electrode assembly 210 side of the opening 321 as a fold line in the inward direction along the stacking direction of the unit cell 140 (direction toward the anode side separator 310), and in the inward direction along the X direction (the direction toward the membrane electrode assembly 210.

As shown in FIG. 4A and FIG. 4B, the folded back part 322 is constituted by a perpendicular part that is roughly perpendicular to the surface direction (i.e., roughly parallel to the stacking direction) and a parallel part that is roughly parallel to the surface direction. The position along the stacking direction of the parallel part of the folded back part 322 is a position slightly nearer the cathode side than the position of the electrolyte membrane 212. An internal flow path space 350 is formed between the parallel part of the folded back part 322 and the part of the cathode side separator 320 facing the parallel part of the folded back part 322 along the stacking direction. Also, a plurality of communication holes 326 for allowing communication between the fuel gas supply manifold 162 and the internal flow path space 350 are formed on the perpendicular part of the folded back part 322. The plurality of communication holes 326 are arranged aligned with a specified interval mutually opened along the Y direction.

At the position of the cathode side separator 320 facing the parallel part of the folded back part 322 along the stacking direction, a plurality of convex parts 324 with a convex shape in the direction from the cathode side separator 320 to the anode side separator 310 (i.e., a shape projecting in the inner flow path space 350) are formed. The plurality of convex parts 324 are arranged aligned with a specified interval mutually opened along the Y direction so as not to have the position along the Y direction overlap the communication holes 326. Each of the convex parts 324 has a plane that is roughly rectangular in shape extending in the X direction. The position along the stacking direction of the part roughly parallel to the surface direction of each convex part 324 is a position adjacent to the parallel part of the folded back part 322.

Similarly, as shown in FIG. 5A and FIG. 5B a folded back part 325 is formed at the position adjacent to the opening 323 constituting the oxidizing gas supply manifold 152 of the cathode side separator 320. The folded back part 325 is formed by folding back at least part of a metal plate as the material of the cathode side separator 320 of the position at which the opening 323 is formed along a boundary line on the membrane electrode assembly 210 side of the opening 323 as a fold line in the inward direction along the stacking direction of the unit cell 140 and in the inward direction along the X direction. The folded back part 325 is constituted by the perpendicular part that is roughly perpendicular to the surface direction and the parallel part that is roughly parallel to the surface direction. The position along the stacking direction of the parallel part of the folded back part 325 is a position slightly nearer the cathode side than the position of the electrolyte membrane 212, and is a position such that a slight space is ensured for the seal with the electrolyte membrane 212. An internal flow path space 360 is formed between the parallel part of the folded back part 325 and the part of the cathode side separator 320 facing the parallel part of the folded back part 325 along the stacking direction. At the perpendicular part of the folded back part 325, a plurality of communication holes 326 are formed for communication between the oxidizing gas supply manifold 152 and the internal flow path space 360. The plurality of communication holes 326 are arranged aligned with a specified interval mutually opened along the Y direction.

At the position of the cathode side separator 320 facing the parallel part of the folded back part 325 along the stacking direction, a plurality of convex parts 324 of a convex shape in the direction from the cathode side separator 320 to the anode side separator 310 (i.e., a shape projecting in the internal flow path space 360) are formed. The plurality of convex parts 324 are arranged aligned with a specified interval mutually opened along the Y direction such that the positions along the Y direction do not overlap the communication holes 326. Each convex part 324 has a plane of a roughly rectangular shape extending in the X direction. The position along the stacking direction of the part that is roughly parallel to the surface direction of each convex part 324 is the position adjacent to the parallel part of the folded back part 325.

Note that with the description below, the folded back part 322 adjacent to the opening 321 constituting the fuel gas supply manifold 162 on the cathode side separator 320 is called the fuel gas side folded back part 322, and the folded back part 325 adjacent to the opening 323 constituting the oxidizing gas supply manifold 152 on the cathode side separator 320 is called the oxidizing gas side folded back part 325. The fuel gas side folded back part 322 of this embodiment corresponds to the second folded back part of the present invention, and the oxidizing gas side folded back part 325 of this embodiment corresponds to the first folded back part of the present invention. The convex part 324 of this embodiment corresponds to the first convex part of the present invention.

As shown in FIG. 4A and FIG. 4B, the length along the X direction of the parallel part of the fuel gas side folded back part 322 is a length such that the fuel gas side folded back part 322 does not overlap the electrolyte membrane 212 along the stacking direction. In contrast to this, as shown in FIG. 5A and FIG. 5B, the length along the X direction of the parallel part of the oxidizing gas side folded back part 325 is a length such that the oxidizing gas side folded back part 325 overlaps the electrolyte membrane 212 along the stacking direction. That is, the length along the X direction of the parallel part of the fuel gas side folded back part 322 is shorter than the length along the X direction of the parallel part of the oxidizing gas side folded back part 325. In FIG. 3A and FIG. 3B, the positions of the parallel part of the fuel gas side folded back part 322 and the parallel part of the oxidizing gas side folded back part 325 on the plane of the unit cell 140 are shown with hatching.

On the cathode side separator 320, in addition, at the position facing the projecting part of the electrolyte membrane 212 is formed a convex part 327 which is convex in the direction from the cathode side separator 320 to the anode side separator 310 (see FIG. 4A and FIG. 4B). The position along the stacking direction of the part that is roughly parallel to the surface direction of the convex part 327 is almost the same position as the parallel part of the fuel gas side folded back part 322. A filling material 430 is filled at the outside along the stacking direction of the convex part 327. Note that the convex part 327 is not formed at the position facing the oxidizing gas side folded back part 325 (see FIG. 5A and FIG. 5B).

On the cathode side separator 320, at positions enclosing the three sides other than the side on which the fuel gas side folded back part 322 of the opening 321 and at a position enclosing the three sides other than the side on which the oxidizing gas side folded back part 325 of the opening 323, convex parts 329 which are convex in the direction from the cathode side separator 320 to the anode side separator 310 are formed (see FIG. 3A through FIG. 5B). The position along the stacking direction of the part roughly parallel to the surface direction of the convex part 329 is almost the same position as the parallel part of the folded back parts 322 and 325.

As shown in FIG. 4A through FIG. 5B, on the anode side separator 310, the same as with the cathode side separator 320, at a position to the surface direction outside from the position facing the membrane electrode assembly 210, an opening 311 constituting the fuel gas supply manifold 1.62 is formed, and also, an opening 313 constituting the oxidizing gas supply manifold 152 is formed. Also, at the surface direction outside from the position facing the fuel gas side folded back part 322 of the cathode side separator 320 on the anode side separator 310, a convex part 312 of a shape that is convex in the direction from the anode side separator 310 to the cathode side separator 320 is formed. The position along the stacking direction of the part roughly parallel to the surface direction of the convex part 312 is a position such that a slight space is ensured for sealing between the fuel gas side folded back part 322 and the part roughly parallel to the surface direction of the convex part 329. Also, at the surface direction outside from the position facing the oxidizing gas side folded back part 325 of the cathode side separator 320 on the anode side separator 310 is formed a convex part 315 of a shape that is convex in the direction from the anode side separator 310 to the cathode side separator 320. The position along the stacking direction of the part roughly parallel to the surface direction of the convex part 315 is a position such that a slight space is ensured, for sealing between the oxidizing gas side folded back part 325 and the part roughly parallel to the surface direction of the convex part 329.

Note that on the anode side separator 310, the folded back parts 322 and 325 are not formed, as they are with the cathode side separator 320. The cathode side separator 320 of the first embodiment corresponds to the first separator of the present invention, and the anode side separator 310 of the first embodiment corresponds to the second separator of the present invention.

As shown in FIG. 4A and FIG. 4B, a sealant 420 is placed for sealing between the parallel part of the fuel gas side folded back part 322 of the cathode side separator 320 and the convex part 312 of the anode side separator 310 (i.e., R2 part in the drawing). Also, a sealant 410 is placed, for sealing between the convex part 327 of the cathode side separator 320 and the electrolyte membrane 212 (i.e., R1 part in the drawing). Also, as shown in FIG. 5A and FIG. 5B, a sealant 440 is placed for sealing between the parallel part of the oxidizing gas side folded back part 325 of the cathode side separator 320 and the convex part 315 of the anode side separator 310, and between the parallel part of the oxidizing gas side folded back part 325 and the electrolyte membrane 212 (i.e., R3 part in the drawing). Furthermore, a sealant 450 is placed for sealing between the convex part 329 of the cathode side separator 320 and the convex parts 312 and 315 of the anode side separator 310. Each sealant exhibits a sealing function and a shorting prevention function at the sealing locations. As a sealant, adhesives or thermoplastic resins may be used. As shown in FIG. 4A and FIG. 4B, the positions along the stacking direction of the sealants 410, 420, 440, and 450 are roughly the same.

In FIG. 3A through FIG. 5B, the constitution near the fuel gas supply manifold 162 and the oxidizing gas supply manifold 152 of the unit cell 140 is shown, but the constitution near the fuel gas exhaust manifold 164 and the oxidizing gas exhaust manifold 154 is the similar. Specifically, near the fuel gas exhaust manifold 164 of the unit cell 140, an opening constituting the fuel gas exhaust manifold 164 is formed, and adjacent to that opening is formed a folded back part 322 for which part of the metal plate is folded back in the direction of the membrane electrode assembly 210. On the folded back part 322 is formed a communication hole for allowing communication between the internal flow path space formed between the folded back part 322 and the cathode side separator 320, and the fuel gas exhaust manifold 164. Also, near the oxidizing gas exhaust manifold 154 of the unit cell 140 is formed an opening constituting the oxidizing gas exhaust manifold 154, and adjacent to that opening is formed a folded, back part 325 for which part of the metal plate is folded back in the direction of the membrane electrode assembly 210. On the folded back part 325 is formed a communication hole for allowing communication between the internal flow path space formed between the folded back part 325 and the cathode side separator 320, and the oxidizing gas exhaust manifold 154.

As shown in FIG. 4A through FIG. 5B, on the unit cell 140, a gasket 500 is arranged to form a seal line SL enclosing in the surface direction the power generating module 200 and each manifold opening shown in FIG. 2 and FIG. 3A when stacking a plurality of unit cells 140. The gasket 500 is formed using injection molding. The gasket 500 has a convex part 502. The convex part 502 of the gasket 500 arranged on a certain unit cell 140 forms a seal line SL by adhering to the surface of the convex part 312 and 315 of the anode side separator 310 of the adjacent other unit cells 140 when stacking a plurality of unit cells 140. The arrangement of the gasket 500 and the convex part 502 on the plane of the unit cell 140 is an arrangement such that the convex part 324 and the convex part 329 overlap at the cross section shown in FIG. 4A through FIG. 5B.

At the position facing the membrane electrode assembly 210 of the anode side separator 310, a plurality of dimples 319 are formed. When stacking a plurality of unit cells 140, the surface furthest outside in the stacking direction of the dimple 319 is in contact with the surface of the cathode side separator 320 of the other unit cell 140 adjacent along the stacking direction. By doing this, a space communicating along the surface direction is formed between the two unit cells 140 (specifically, between the anode side separator 310 and the cathode side separator 320 adjacent to the concerned anode side separator 310 without intervention of the membrane electrode assembly 210). This space allows communication of the cooling medium supply manifold 172 and the cooling medium discharge manifold 174 shown in FIG. 2, and is used as the cooling medium flow path. Note that the dimple 319 corresponds to the second convex part of the present invention.

As shown by the arrows in FIG. 4A and FIG. 4B, the hydrogen as the fuel gas supplied to the fuel gas supply manifold 162 is led to the internal flow path space 350 via the communication holes 326. The internal flow path space 350 communicates with the anode side end surface (surface roughly perpendicular to the surface direction) of the power generating module 200. Because of that, the fuel gas led to the internal flow path space 350 is supplied to the anode side diffusion layer 216 and the anode 214 while flowing in the anode side porous body flow path layer 220. The fuel gas not consumed with the power generating module 200 is exhausted to the fuel gas exhaust manifold 164 via the internal flow path space (not illustrated) formed at the fuel gas exhaust manifold 164 side.

Also, as shown by the arrows in FIG. 5A and FIG. 5B, the air as the oxidizing gas supplied to the oxidizing gas supply manifold 152 is led to the internal flow path space 360 via the communication holes 326. The internal flow path space 360 communicates with the cathode side end, surface of the power generating module 200. Because of that, the oxidizing gas led to the internal flow path space 360 is supplied to the cathode side diffusion layer 217 and the cathode 215 while flowing in the cathode side porous body flow path layer 230. The oxidizing gas not consumed by the power generating module 200 is exhausted to the oxidizing gas exhaust manifold 154 via the internal flow path space (not illustrated) formed at the oxidizing gas exhaust manifold 154 side.

Figure 7:
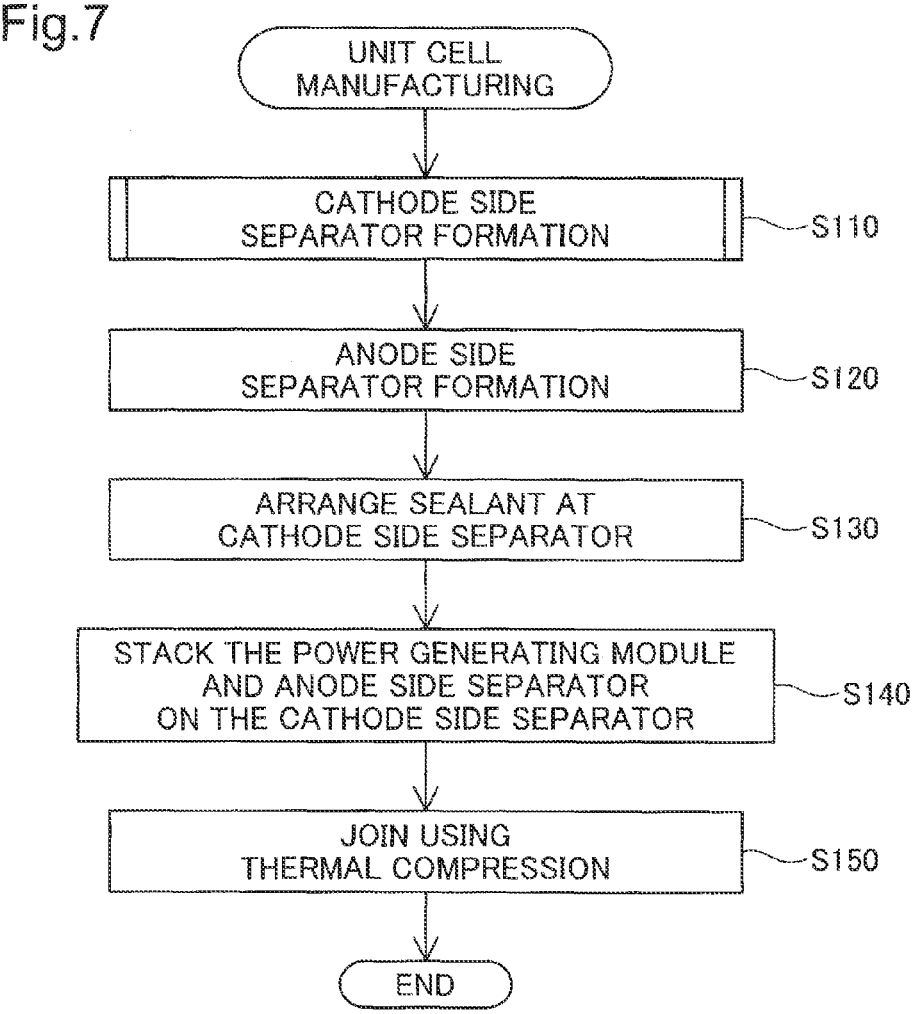
FIG. 7 is a flow chart showing the manufacturing process of the unit cell 140 of the first embodiment.
Figure 8:
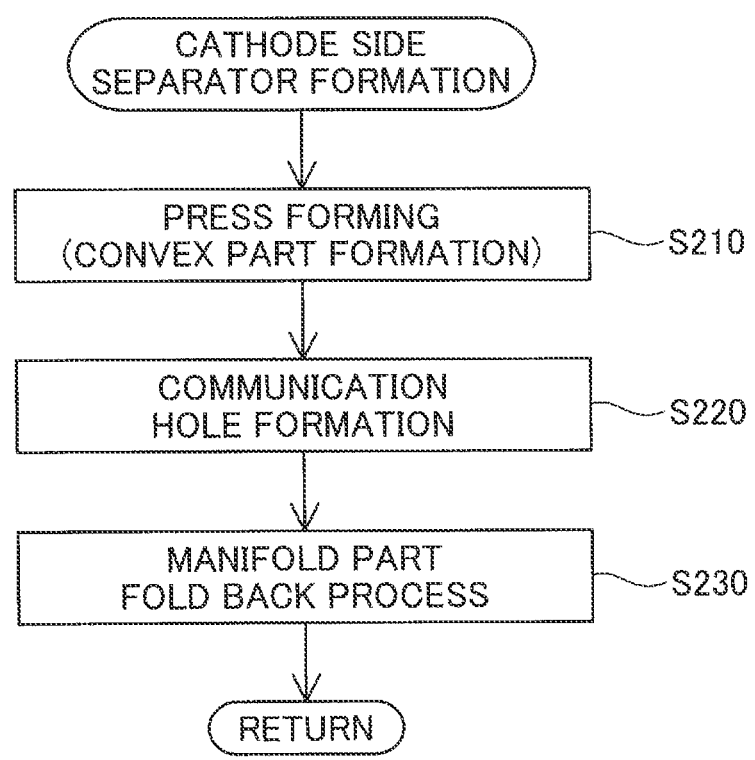
FIG. 8 is a flow chart showing the formation process of the cathode side separator 320.

FIG. 7 is a flow chart showing the manufacturing process of the unit cell 140 of the first embodiment. At step S110 of the manufacturing process of the unit cell 140, formation of the cathode side separator 320 is executed. FIG. 8 is a flow chart showing the formation process of the cathode side separator 320. Also, FIG. 9A through FIG. 9D are explanatory drawings showing the state of the cathode side separator 320 at each stage in the cathode side separator 320 formation process. In FIG. 9A through FIG. 9D, the state of the part near the opening 321 that constitutes the fuel gas supply manifold 162 of the cathode side separator 320 is shown, but the state of the part near the opening 323 that constitutes the oxidizing gas supply manifold 152 is the same.

Figure 9A:
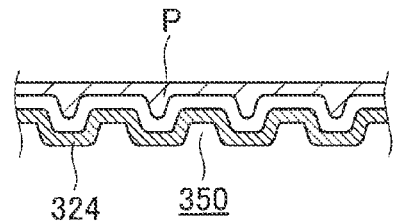
FIG. 9A through FIG. 9D are explanatory drawings showing the state of the cathode side separator 320 at each stage in the cathode side separator 320 formation process.
Figure 9B:
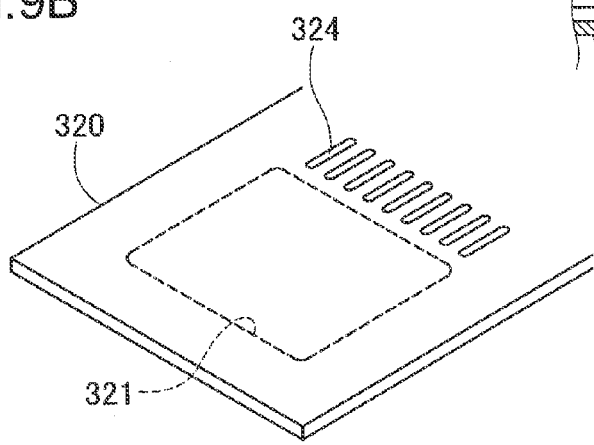

At step S210 of the formation process of the cathode side separator 320, a press forming process is implemented on the metal plate as the material of the cathode side separator 320, and the convex part 324 is formed. In FIG. 9A, the metal plate as the material of the cathode side separator 320 is pressed by a press machine P, and the state with the convex part 324 formed is shown. Note that the part of the metal plate for which the convex part 324 is not formed becomes the internal flow path space 350 (or the internal flow path space 360). In FIG. 9B, at a position that is surface direction inward from the position at which the opening 321 is formed on the metal plate (the membrane electrode assembly 210 side), the state with the convex part 324 formed is shown. Note that with this press formation process, in addition to the convex part 324, convex part 327 and convex part 329 are also formed.

Figure 9C:
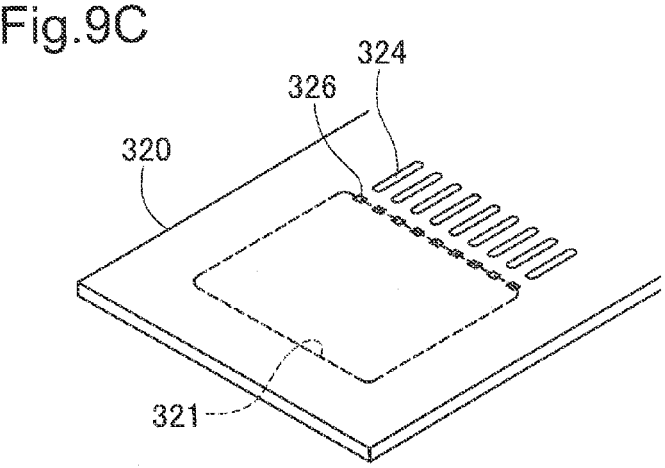

At step S220 of the formation process of the cathode side separator 320, a hole opening process is implemented in the metal plate as the material of the cathode side separator 320 to form the communication holes 326. In FIG. 9C, the state of the communication holes 326 formed on the metal plate is shown. The communication holes 326 are formed so as to be aligned along the X direction near the fold line of the opening 321 (or the opening 323), and so that the position along the Y direction does not overlap the convex part 324.

Figure 9D:
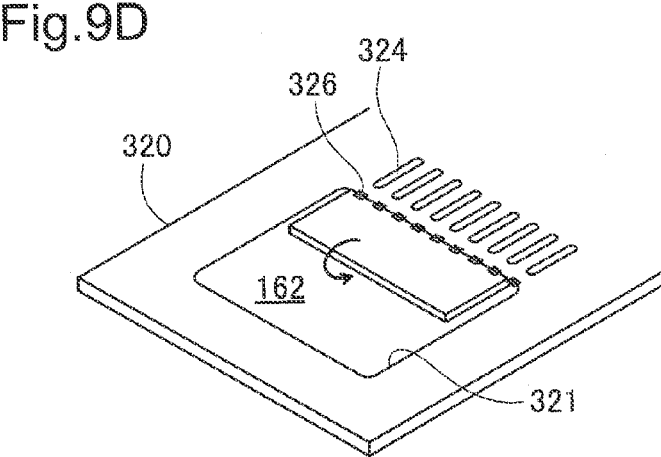

At the step S230 of the formation process of the cathode side separator 320, a folding process is implemented on the metal plate as the material of the cathode side separator 320 to form the fuel gas side folded back part 322 and the oxidizing gas folded back part 325. In FIG. 9D, together with formation of the opening 321 on the metal plate, the state of folding processing of part of the metal plate at the position on which the opening 321 is formed is shown. By doing this, on the cathode side separator 320, an opening 321 that constitutes the fuel gas supply manifold 162 and the opening 323 that constitutes the oxidizing gas supply manifold 152 are formed, and, also, the fuel gas side folded back part 322 and the oxidizing gas side folded back part 325 are formed.

At step S120 of the unit cell 140 manufacturing process (FIG. 7), formation of the anode side separator 310 is executed. With formation of the anode side separator 310, press forming processing is implemented on the metal plate as the material, and openings 311 and 313, dimple 319, and convex parts 312 and 315 are formed.

At step S130 of the unit cell 140 manufacturing process, a sealant is arranged at the cathode side separator 320. The sealant is arranged at the positions of the sealants 410, 420, 440, and 450 described above. At step S140, each layer constituting the power generating module 200 is stacked on the cathode side separator 320, and furthermore, the anode side separator 310 is stacked. At step S160, joining is done using thermal compression in the stacked state, and manufacturing of the unit cell 140 is completed.

As described above, with the fuel cell 100 of the first embodiment, the opening 321 constituting the fuel gas supply manifold 162 and the opening 323 constituting the oxidizing gas supply manifold 152 are formed, and on the anode side separator 310, the opening 311 constituting the fuel gas supply manifold 162 and the opening 313 constituting the oxidizing gas supply manifold 152 are formed. The cathode side separator 320 has the folded back part 322 that is formed by folding back at least part of the metal plate of the position at which the opening 321 is formed toward the membrane electrode assembly 210 side along a boundary line on the membrane electrode assembly 210 side of the opening 321 as a fold line. Also, the cathode side separator 320 has a folded back part 325 that is formed by folding back at least part of the metal plate of the position at which the opening 323 is formed toward the membrane electrode assembly 210 side along a boundary line on the membrane electrode assembly 210 side of the opening 323 as a fold line. Between the parallel part of the folded back part 322 and the folded back part 325, and the cathode side separator 320, internal flow path spaces 350 and 360 that communicate with the end surface of the membrane electrode assembly 210 are formed. Also, at the perpendicular part of the folded back part 322 and the folded back part 325, communication holes 326 that allow communication of the internal flow path spaces 350 and 360 and the fuel gas supply manifold 162 and the oxidizing gas supply manifold 152 are formed. Also, the folded back part is similarly formed near the fuel gas exhaust manifold 164 and, oxidizing gas exhaust manifold 154 of the cathode side separator 320 as well by folding back a part of the metal plate. Because of that, with the fuel cell 100 of the first embodiment, it is possible to achieve both ensuring of the gas flow path and ensuring of the gas sealing properties at the reaction gas lead-in/out part. Also, with the fuel cell 100 of the first embodiment, because a folded back part is not formed at the anode side separator 310, compared to when a folded back part is formed at both of the cathode side separator 320 and the anode side separator 310, it is possible to suppress greater complexity of the processing steps and an increase in the size of the fuel cell.

Also, with the fuel cell 100 of the first embodiment, compared to a case when both ensuring of the gas flow path and ensuring of the gas sealing properties at the reaction gas lead-in/out part are realized using particular separate parts such as a resin frame or resin film or the like on which a gas flow path is implemented, it is possible to reduce the number of parts, make the processing steps simpler, and reduce costs.

Also, with the fuel cell 100 of the first embodiment, with the reaction gas lead-in/out part, the reaction gas is lead in and out via the end surface of the power generating module 200 (surface roughly parallel to the surface direction), so compared to a case when both ensuring of the gas flow path and ensuring of the sealing properties are realized by leading the reaction gas in and out via the stacking surface of the power generating module 200 (surface parallel to the surface direction), it is possible to improve the electrode usage rate and also to suppress a decrease in the drainage performance due to gas pooling. Furthermore, with the fuel cell 100 of the first embodiment, it is possible to give the gasket 500 backup function to the metal separator rather than to the electrode, so compared to a case of giving the gasket 500 backup function to the electrode, it is possible to improve the electrode durability.

Also, with the fuel cell 100 of the first embodiment, a sealant is placed for sealing between the parallel part of the fuel gas side folded back part 322 of the cathode side separator 320 and the anode side separator 310, and between the parallel part of the oxide gas side folded back part 325 and the anode side separator 310, so compared to a case when a sealant is placed between the separator and the membrane electrode assembly, it is possible to make the area of the membrane electrode assembly 210 smaller while achieving ensuring of the gas sealing properties of the reaction gas lead-in/out part, and also to reduce costs.

Also, with the fuel cell 100 of the first embodiment, the length along the surface direction of the parallel part of the oxidizing gas side folded back part 325 that forms the internal flow path space 360 that supplies oxidizing gas to the cathode side separator 320 side electrode (cathode) or exhausts oxidizing gas from the cathode is longer than the length along the surface direction of the parallel part of the fuel gas side folded back part 322 that forms the internal flow path space 350 that supplies fuel gas to the opposite side electrode (anode) or exhausts fuel gas from the anode. Because of that, with the fuel cell 100 of the first embodiment, it is possible to reduce greatly the flow path resistance of the reaction gas at the oxidizing gas side gas lead-in/out part. Also, with the fuel cell 100 of the first embodiment, while the length of the parallel part of the oxidizing gas side folded back part 325 is of a length such that the oxidizing gas side folded back part 325 overlaps the electrolyte membrane 212 along the stacking direction, whereas the length of the parallel part of the fuel gas side folded back part 322 is of a length such that the fuel gas side folded back part 322 does not overlap the electrolyte membrane 212 along the stacking direction, it is possible to have a connection for which a good seal can be formed for the connection of the parallel part of the oxidizing gas side folded back part 325 and the electrolyte membrane 212 while ensuring communication of the fuel gas internal flow path space 350 and the anode side end surface of the power generating module 200, and it is possible to suppress the occurrence of cross leaks.

Also, with the fuel cell 100 of the first embodiment, a sealant is placed for sealing between the parallel part of the fuel gas side folded back part 322 of the cathode side separator 320 and the convex part 312 of the anode side separator 310, between the convex part 327 of the cathode side separator 320 and the electrolyte membrane 212, between the oxidizing gas side folded back part 325 of the cathode side separator 320 and the convex part 315 of the anode side separator 310, and between the parallel part of the oxidizing gas side folded back part 325 and the electrolyte membrane 212, and the positions along the stacking direction of each sealant is roughly the same, so it is possible to used sealing parts of a simple shape, or it is possible to coat a sealant using a simple method of screen printing, so it is possible to make the manufacturing process easier and to reduce costs.

Also, with the fuel cell 100 of the first embodiment, at the position of the cathode side separator 320 facing the parallel part of the fuel gas side folded back part 322 and the oxidizing gas side folded back part 325, a plurality of the convex parts 324 of a shape projecting in the internal flow path space 350 and 360 are formed aligned in the direction roughly parallel to the fold line. Because of that, with the fuel cell 100 of the first embodiment, a plurality of small flow path spaces extending in the direction roughly parallel with the fold line (the direction from the manifold to the membrane electrode assembly 210) are formed in the internal flow path spaces 350 and 360, so it is possible to improve the gas distribution at the reaction gas lead-in/out part.

Also, with the fuel cell 100 of the first embodiment, because the position along the stacking direction of the receiving surface of the gasket 500 at the anode side separator 310 (i.e., convex part 312 and convex part 315) are the same in-plane, it is possible to make the shape of the gasket 500 a simple shape, and it is possible to reduce the costs of the forming metal mold.

Figure 10A:
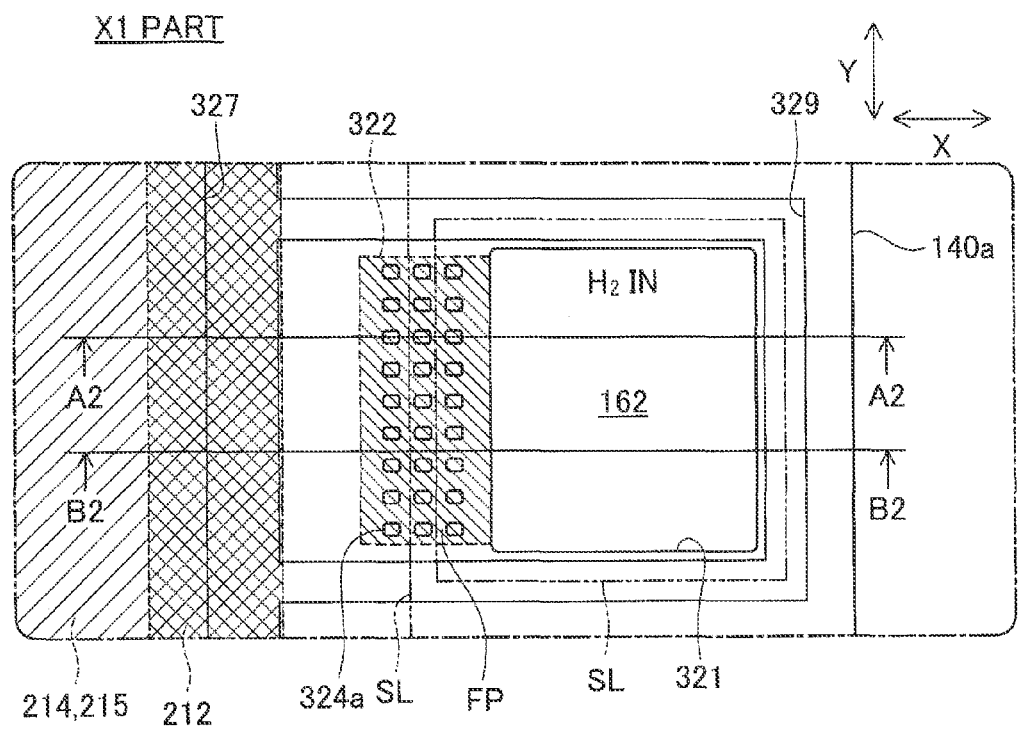
FIG. 10A and FIG. 10B are explanatory drawings showing the planar constitution of the unit cell 140a constituting the fuel cell 100 of a second embodiment.
Figure 10B:
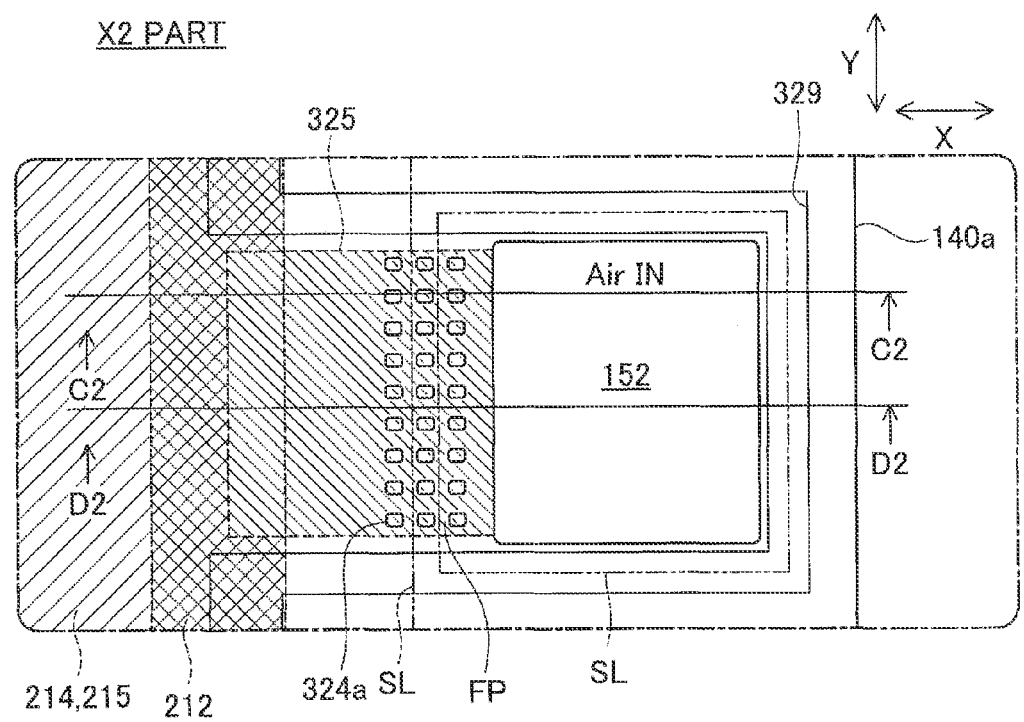
Figure 13:
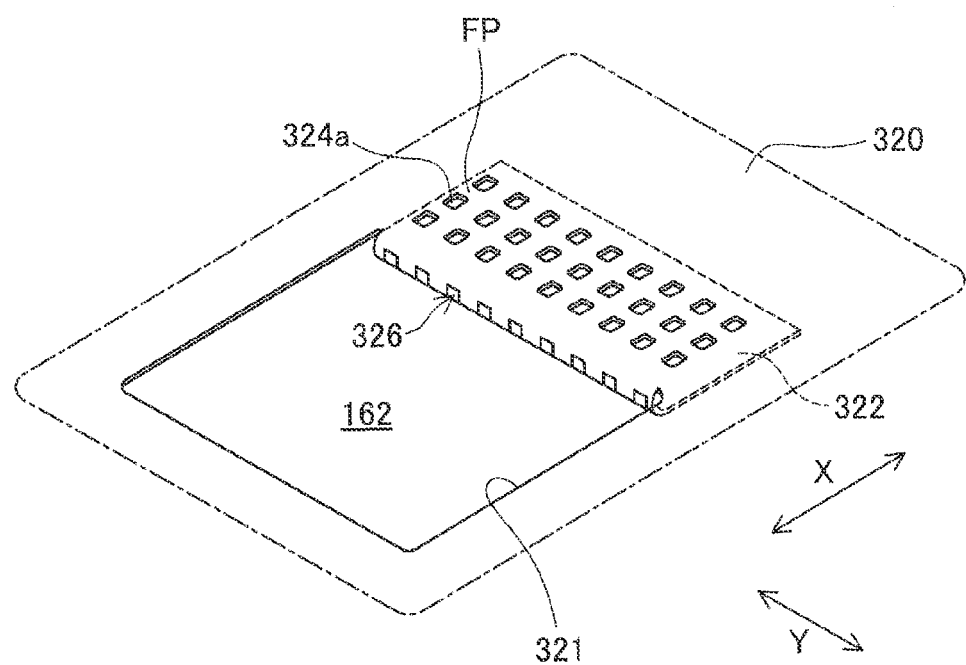
FIG. 13 is a perspective view showing the constitution near the opening 321 of the cathode side separator 320 of the second embodiment.

B. Second Embodiment:

FIG. 10A and FIG. 10B are explanatory drawings showing the planar constitution of the unit cell 140*a* constituting the fuel cell 100 of a second embodiment. In FIG. 10A shows an enlarged planar constitution of the part (X1 part in FIG. 2) near the fuel gas supply manifold 162 of the unit cell 140*a*, and FIG. 10B shows an enlarged planar constitution of the part (X2 part in FIG. 2) near the oxidizing gas supply manifold 152 of unit cell 140*a*. FIG. 11A, FIG. 11B, FIG. 12A and FIG. 12B are explanatory drawings showing the cross sectional constitution of the unit cell 140*a* of the second embodiment. FIG. 11A shows the A2-A2 cross section of FIG. 10A, FIG. 11B shows the B2-B2 cross section of FIG. 10A, FIG. 12A shows the C2-C2 cross section of FIG. 10B, and FIG. 12B shows the D2-D2 cross section of FIG. 10B. FIG. 13 is a perspective view showing the constitution near the opening 321 of the cathode side separator 320 of the second embodiment.

The constitution of the unit cell 140*a* of the second embodiment is different from the constitution of the unit cell 140 of the first embodiment in regards to the constitution of the convex part 324*a* and the gasket 500*a*, and is the same as the constitution of the unit cell 140 of the first embodiment in regards to other points. As shown in FIG. 10A through FIG. 13, the convex part 324*a* of the unit cell 140*a* of the second embodiment is divided by a flat shaped flat part FP. The flat part FP is the remaining part of the metal plate that was not pressed with the metal plate press forming process (step S210 in FIG. 8).

The flat part FP of the convex part 324*a* is provided at two positions aligned along the direction from the openings 321 and 323 toward the membrane electrode assembly 210 (X direction). In specific terms, the position of the flat part FP of the convex part 324*a* matches the position of the convex part 502 of the gasket 500a. Specifically, the gasket 500a is formed such that the convex part 502 is positioned at the position of the flat part FP of the convex part 324a. The convex part 502 of the gasket 500a forms a seal line SL adhered to the surface of the convex parts 312 and 315 of the anode side separator 310 of the other adjacent unit cell 140a when stacking a plurality of unit cells 140a. At this time, the flat part FP functions as a gasket 500a backup. Therefore, with the unit cell 140a of the second embodiment, the position along the stacking direction of the part of the cathode side separator 320 that functions as the gasket 500a backup is the same in-plane. The arrangement of the gasket 500a and the convex part 502 on the plane of the unit cell 140a, the same as with the first embodiment, is an arrangement for which a seal line SL is formed that encloses in the surface direction the power generating module 200 and the opening for each manifold.

Note that FIG. 10A through FIG. 13 show the constitution near the fuel gas supply manifold 162 and the oxidizing gas supply manifold 152 of the unit cell 140a, but the constitution near the fuel gas exhaust manifold 164 and the oxidizing gas exhaust manifold 154 is the same.

With the unit cell 140a constituting the fuel cell 100 of the second embodiment, the same as with the first embodiment, folded back parts 322 and 325 are formed on the cathode side separator 320, so it is possible to achieve both ensuring of the gas flow path and ensuring of the gas sealing properties at the reaction gas lead-in/out part while suppressing greater complexity of the processing steps and an increase in the size of the fuel cell.

Also, with the fuel cell 100 of the second embodiment, the position along the stacking direction of the part of the cathode side separator 320 that functions as a gasket 500a backup is the same in-plane, so it is possible to have the reaction force at the seal line SL of the gasket 500a be the same in-plane, and it is possible to suppress leaking of reaction gas and also possible to suppress the occurrence of partial degradation of the gasket or deformation of the separator. Also, with the fuel cell 100 of the second embodiment, the cross section shape of the gasket 500a is the same in-plane, so it is possible to simplify the gasket forming process. Also, by forming the gasket 500a only at the flat part FP at the position at which the convex part 324a is formed, it is possible to reduce the volume of material used for gasket formation. Also, with the fuel cell 100 of the second embodiment, because the internal flow path spaces 350 and 360 communicate with the other internal flow path spaces 350 and 360 adjacent in the Y direction at the flat part FP of the convex part 324a, the gas diffusion properties at the reaction gas lead-in/out part are improved. Also, with the fuel cell 100 of the second embodiment, the convex part 324a has a flat part FP, so the second moment of area at the convex part 324a becomes larger, and the rigidity of the manifold periphery becomes higher.

C. Third Embodiment

Figure 15A:
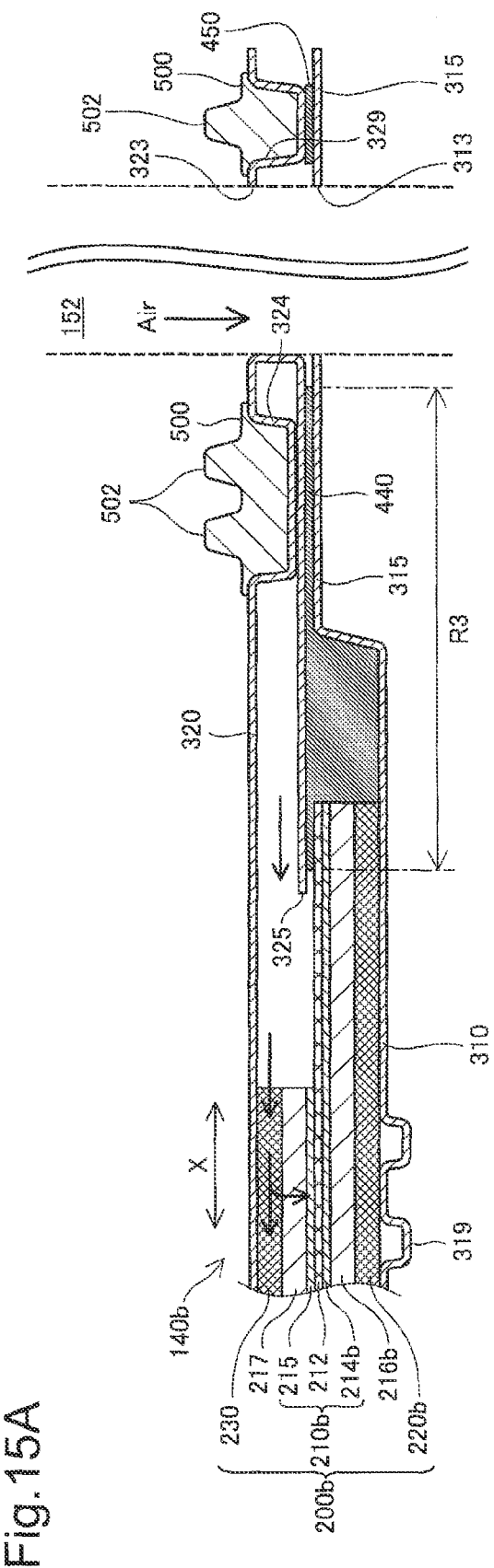
FIG. 15A and FIG. 15B are explanatory drawings showing the cross section constitution of the unit cell 140b constituting the fuel cell 100 of the third embodiment.
Figure 15B:
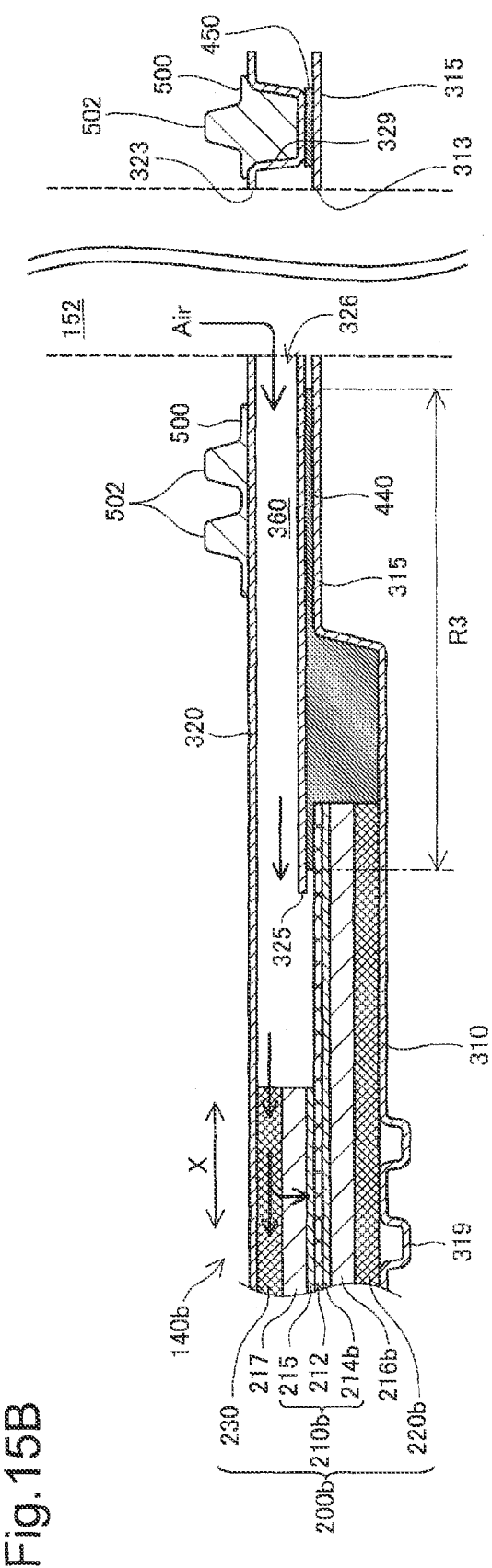

FIG. 14A, FIG. 14B, FIG. 15A and FIG. 15B are explanatory drawings showing the cross section constitution of the unit cell 140b constituting the fuel cell 100 of the third embodiment. FIG. 14A shows the A1-A1 cross section of FIG. 3A, FIG. 14 B shows the B1-B1 cross section of FIG. 3A, FIG. 15A shows the C1-C1 cross section of FIG. 3B, and FIG. 15B shows the D1-D1 cross section of FIG. 3B.

The constitution of the unit cell 140b of the third embodiment differs from the unit cell 140 of the first embodiment in regards to the point of the constitution of the power generating module 200b, and the other points are the same as the constitution of the unit cell 140 of the first embodiment. As shown in FIG. 14A through FIG. 15B, with the power generating module 200b of the unit cell 140b of the third embodiment, the length along the surface direction (X direction) of each layer of the cathode side (cathode 215, cathode side diffusion layer 217, cathode side porous body flow path layer 230) is shorter than the length along the surface direction of each layer of the anode side (anode 214b, anode side diffusion layer 216b, anode side porous body flow path layer 220b) and the electrolyte membrane 212. Specifically, with the unit cell 140b of the third embodiment, each anode side layer of the unit cell 140 of the first embodiment shown in FIG. 4A through FIG. 5B has a constitution extended to the same length as the electrolyte membrane 212 along the surface direction.

With the unit cell 140b of the third embodiment as well, the same as with the unit cell 140 of the first embodiment, a sealant is placed for sealing between the parallel part of the fuel gas side folded back part 322 of the cathode side separator 320 and the convex part 312 of the anode side separator 310 (i.e., R2 part in the drawing), between the convex part 327 of the cathode side separator 320 and the electrolyte membrane 212 (i.e., R1 part in the drawing), between the parallel part of the oxidizing gas side folded back part 325 of the cathode side separator 320 and the convex part 315 of the anode side separator 310, and between the parallel part of the oxidizing gas side folded back part 325 and the electrolyte membrane 212 (i.e., R3 part in the drawing). The position along the stacking direction of each sealant is roughly the same.

Note that FIG. 14A through FIG. 15B show the constitution near the fuel gas supply manifold 162 and the oxidizing gas supply manifold 152 of the unit cell 140b, but the constitution near the fuel gas exhaust manifold 164 and the oxidizing gas exhaust manifold 154 is also the same.

With the unit cell 140b constituting the fuel cell 100 of the third embodiment, the same as with the first embodiment, folded back parts 322 and 325 are formed on the cathode side separator 320, so it is possible to achieve both ensuring of the gas flow path and ensuring of the gas sealing properties at the reaction gas lead-in/out part while suppressing greater complexity of the processing steps and in increase in the size of the fuel cell.

Also, with the unit cell 140b of the third embodiment, the same as with the first embodiment, the length along the surface direction of each layer of the cathode side is shorter than the length along the surface direction of the electrolyte membrane 212, so it is possible to seal between the cathode side separator 320 convex part 327 and the electrolyte membrane 212, and it is possible to suppress the occurrence of cross leak. Also, with the unit cell 140b of the third embodiment, the length along the surface direction of each layer of the cathode side is shorter than the length along the surface direction of each layer of the anode side (i.e., the length of each anode side layer is longer than the length of each cathode side layer), so each anode side layer is arranged at the part at which each cathode side layer is not arranged on the electrolyte membrane 212, and the electrolyte membrane 212 is reinforced by each of the anode side layers. Because of this, with the fuel cell 100 of the third embodiment, it is possible to suppress the occurrence of cross leak due to breaking of the electrolyte membrane 212. Also, with the fuel cell 100 of the third embodiment, each cathode side layer is shorter than each anode side layer, so it is possible to suppress the occurrence of shorting by direct contact of both of these.

D. Fourth Embodiment:

FIG. 16A, FIG. 16B, FIG. 17A and FIG. 17B are explanatory drawings showing the cross section constitution of the unit cell 140c constituting the fuel cell 100 of a fourth embodiment. FIG. 16A shows the A1-A1 cross section of FIG. 3A, FIG. 16B shows the B1-B1 cross section of FIG. 3A, FIG. 17A shows the C1-C1 cross section of FIG. 3B, and FIG. 17B shows the D1-D1 cross section of FIG. 3B.

The constitution of the unit cell 140c of the fourth embodiment differs from the constitution of the unit cell 140 of the first embodiment in regards to the point of the constitution of the fuel gas side folded back part 322c and the oxidizing gas side folded back part 325c, and is the same as the constitution of the first embodiment in regards to the other points. As shown in FIG. 16A through FIG. 17B, with the unit cell 140c of the fourth embodiment, a tip side folded back part BP that bends toward the cathode side separator 320 side is formed, on the tip position of the parallel part of the fuel gas side folded back part 322c and the oxidizing gas side folded back part 325c. With the fourth embodiment, the tip of the tip side folded back part BP is in contact with the surface of the cathode side separator 320. At the position facing the communication hole 326 along the X direction with the tip side folded back part BP is formed communication hole 328 that allows communication of the inner flow path spaces 350 and 360 and the membrane electrode assembly 211) side internal space.

With the unit cell 140c of the fourth embodiment, hydrogen as the fuel gas supplied to the fuel gas supply manifold 162 is led to the internal flow path space 350 via the communication hole 326, and furthermore, is led to the space in communication with the end surface of the anode side of the power generating module 200 via the communication hole 328. Also, the air as the oxidizing gas supplied to the oxidizing gas supply manifold 152 is led to the internal flow path space 360 via the communication hole 326, and is led to the space communicating with the end surface of the power generating module 200 via the communication hole 328.

Note that FIG. 16A through FIG. 17B show the constitution near the fuel gas supply manifold 162 and the oxidizing gas supply manifold 152 with the unit cell 140c, but the constitution near the fuel gas exhaust manifold 164 and the oxidizing gas exhaust manifold 154 is also the same.

With the unit cell 140c constituting the fuel cell 100 of the fourth embodiment, the same as with the first embodiment, folded back part 322c and 325c are formed on the cathode side separator 320, so it is possible to achieve both ensuring of the gas flow path and ensuring of gas sealing properties at the reaction gas lead-in/out part while suppressing greater complexity of the processing steps and an increase in the size of the fuel cell.

Also, with the unit cell 140c of the fourth embodiment, a tip side folded back part BP folded back toward the side of the cathode side separator 320 is formed at the tip position of the parallel part of the fuel gas side folded back part 322c and the oxidizing gas side folded back part 325c, so it is possible to suppress deformation of the fuel gas side folded back part 322c and the oxidizing gas side folded back part 325c along the anode side separator 310 side stacking direction due to spring back function, and it is possible to suppress shorting due to contact of both separators. Also, at the seal position between the fuel gas side folded back part 322 of the cathode side separator 320 and the anode side separator 310 (R2 part in the drawing) and between the oxidizing gas side folded back part 325 and the electrolyte membrane 212 (R3 part in the drawing), the tip side folded back part BP functions as a seal backup, so it is possible to improve the sealing performance. In particular, at the sealing position between the oxidizing gas side folded back part 325 and the electrolyte membrane 212, the tip side folded back part BP functions as a backup also when the electrolyte membrane 212 has swollen, so it is possible to suppress worsening of the sealing performance and to suppress the occurrence of cross leak. Note that the communication hole 328 is formed on the tip side folded back part BP, so the reaction gas flow path is ensured.

E. Fifth Embodiment:

FIG. 18A, FIG. 18B, FIG. 19A and FIG. 19 are explanatory drawings showing the cross section constitution of the unit sell 140d constituting the fuel cell 100 of the fifth embodiment. FIG. 18A shows the A1-A1 of FIG. 3A, FIG. 18B shows the B1-B1 cross section of FIG. 3A, FIG. 19A shows the C1-C1 cross section of FIG. 3B, and FIG. 19B shows the D1-D1 cross section of FIG. 3B.

The constitution of the unit cell 140d of the fifth embodiment differs from the constitution of the unit cell 140c of the fourth embodiment in regards to the point of the constitution of the fuel gas side folded back part 322d and the oxidizing gas side folded back part 325d, and is the same as the constitution of the unit cell 140c of the fourth embodiment in regards to other points. As shown in FIG. 18A through FIG. 19B, with the unit cell 140d of the fifth embodiment, the length of the tip side folded back part BP of the fuel gas side folded back part 322d and the oxidizing gas side folded back part 325d is shorter than that of the fourth embodiment, and its tip does not reach to the surface of the cathode side separator 320. Specifically, with the fifth embodiment, a gap between the tip of the tip side folded back part BP and the surface of the cathode side separator 320 is ensured.

With the unit cell 140d of the fifth embodiment, hydrogen as the fuel gas supplied to the fuel gas supply manifold 162 is led to the internal flow path space 350 via the communication hole 326, and furthermore, is led to the space that communicates with the anode side end surface of the power generating module 200 via the gap between the tip side folded back part BP and the surface of the cathode side separator 320. Also, the air as the oxidizing gas supplied to the oxidizing gas supply manifold 152 is led to the internal flow path space 360 via the communication hole 326, and furthermore, is led to the space communicating with the cathode side end surface of the power generating module 200 via the gap between the tip side folded back part BP and the surface of the cathode side separator 320.

Note that FIG. 18A through FIG. 19B show the constitution near the fuel gas supply manifold 162 and the oxidizing gas supply manifold 152 of the unit cell 140d, but the constitution near the fuel gas exhaust manifold 164 and the oxidizing gas exhaust manifold 154 is the same.

With the unit cell 140d of the fuel cell 100 of the fifth embodiment, the same as with the first embodiment, folded back parts 322d and 325d are formed on the cathode side separator 320, so it is possible to achieve both ensuring of the gas flow path and ensuring of the gas sealing properties of the reaction gas lead-in/out part while suppressing greater complexity of the processing steps and an increase in the size of the fuel cell.

Also, with the fuel cell 140d of the fifth embodiment, the same as with the fourth embodiment, the tip side folded back part BP is formed at the tip position of the parallel part of the fuel gas side folded back part 322d and the oxidizing gas side folded back part 325d, so it is possible to suppress deformation of the fuel gas side folded back part 322d and the oxidizing gas side folded back part 325d along the anode side separator 310 side stacking direction due to spring back function, and it is possible to suppress the occurrence of shorting due to contact by both separators. Note that because there is a gap between the tip side folded back part BP and the surface of the cathode side separator 320, a reaction gas flow path is ensured.

F. Sixth Embodiment:

FIG. 20A and FIG. 20B are explanatory drawings showing the cross section constitution of the unit cell 140e constituting the fuel cell 100 of the sixth embodiment. FIG. 20A shows the C1-C1 cross section of FIG. 3, and FIG. 20B shows the D1-D1 cross section of FIG. 3B. Note that the A1-A1 cross section and the B1-B1 cross section of FIG. 3A of the fuel cell 100 of the sixth embodiment are the same as those of the first embodiment shown in FIG. 4A and FIG. 4B.

The constitution of the unit cell 140e of the sixth embodiment differs from the constitution of the unit cell 140 of the first embodiment in regards to the point that a convex part 336 of a shape that is convex in the direction toward the anode side separator 310 is formed at a position on the cathode side separator 320e overlapping the electrolyte membrane 212 along the stacking direction, and is the same constitution as the unit cell 140 of the first embodiment regarding other points. The convex part 336 is formed at a position facing the convex part 324 among the parts for which the oxidizing gas side folded back part 325 is formed. The surface of the anode side separator 310 side of the convex part 336 is in contact with the surface of the cathode side separator 320e side of the oxidizing gas side folded, back part 325.

Note that FIG. 20A and FIG. 20B show the constitution near the fuel gas supply manifold 162 and the oxidizing gas supply manifold 152 of the unit cell 140e, but the constitution near the fuel gas exhaust manifold 164 and the oxidizing gas exhaust manifold 154 is the same.

With the unit cell 140e constituting the fuel cell 100 of the sixth embodiment, the same as with the first embodiment, folded back parts 322 and 325 are formed on the cathode side separator 320, so it is possible to achieve both ensuring of a gas flow path and ensuring of gas sealing properties at the reaction gas lead-in/out part while suppressing greater complexity of the processing steps and an increase in the size of the fuel cell.

Also, with the unit cell 140e of the sixth embodiment, the convex part 336 is formed at a position on the cathode side separator 320e overlapping the electrolyte membrane 212 along the stacking direction, and the surface of the convex part 336 is in contact with the surface of the oxidizing gas side folded back, part 325, so it is possible to suppress deformation of the oxidizing gas side folded back part 325 along the anode side separator 310 side stacking direction due to spring back function, and to suppress the occurrence of shorting due to contact of both separators. Also, at the sealing position between the oxidizing gas side folded back part 325 and the electrolyte membrane 212 (R3 part in the drawing), the convex part 336 also functions as a seal backup when the electrolyte membrane 212 is swollen, so it is possible to suppress worsening of the sealing performance, and possible to suppress the occurrence of cross leak.

G. Seventh Embodiment:

FIG. 21A, FIG. 21B, FIG. 22A and FIG. 22B are explanatory drawings showing the cross section constitution of the unit cell 140f constituting the fuel cell 100 of the seventh embodiment. FIG. 21A shows the A1-A1 cross section of FIG. 3A, FIG. 21B shows the B1-B1 cross section of FIG. 3 A. FIG. 22A shows the C1-C1 cross section of FIG. 3B, and FIG. 22B shows the D1-D1 cross section of FIG. 3B.

The constitution of the unit cell 140f of the seventh embodiment differs from the constitution of the unit cell 140 of the first embodiment in regards to the point of the constitution of the anode side separator 310f, but is the same as the constitution of the unit cell 140 of the first embodiment in regards to the other points. As shown in FIG. 21A through FIG. 22B, with the unit cell 140f of the seventh embodiment, an end part folded back part 317 folded back in the direction separating from the cathode side separator 320 is formed at the end part along the surface direction of the anode side separator 310f. Here, the end part along the surface direction of the anode side separator 310f means the position adjacent to the fuel gas supply manifold 162 and the oxidizing gas supply manifold 152 and the outermost periphery of the anode side separator 310f.

The end part folded back part 317 is constituted from a perpendicular part that is roughly perpendicular to the surface direction (roughly parallel to the stacking direction) and a parallel part that is roughly parallel to the surface direction. The position along the stacking direction of the parallel part of the end part folded back part 317 is the same as the position of the flat part of the anode side separator 310f. With the end part folded back part 317 formed at the position adjacent to the fuel gas supply manifold 162 and the oxidizing gas supply manifold 152, the tip of the parallel part constitutes the opening 311 and the opening 313.

Note that FIG. 21A through FIG. 22B show the constitution near the fuel gas supply manifold 162 and the oxidizing gas supply manifold 152 of the unit cell 140f, but the constitution near the fuel gas exhaust manifold 164 and the oxidizing gas exhaust manifold 154 is also the same.

With the unit cell 140f constituting the fuel cell 100 of the seventh embodiment, the same as with the first embodiment, the folded back parts 322 and 325 are formed on the cathode side separator 320, so it is possible to achieve both ensuring of the gas flow path and ensuring of the gas sealing properties at the reaction gas lead-in/out part while suppressing greater complexity of the processing steps and an increase in the size of the fuel cell.

Typically, burrs and warpage occur easily along with cutting processing and hole opening processing for the end part of the metal separator, and deformation occurs easily with the unit cell, so the position of the separator end, part with the unit cell is a position for which shorting between separators occurs easily. With the unit cell 140f of the seventh embodiment, the end part folded back part 317 folded back in the direction separating from the cathode side separator 320 is formed at the end part along the surface direction of the anode side separator 310f, so it is possible to make the distance between the separators bigger, and it is possible to effectively suppress the occurrence of shorting between separators. Also, with the unit cell 140f of the seventh embodiment, the bending strength at the end part is improved by the end part folded back part 317, so it is possible to suppress end part bending deformation.

Also, with the unit cell 140f of the seventh embodiment, a sealant 420 is placed for sealing between the parts other than the end part folded back part 317 of the end part of the anode side separator 310f and the cathode side separator 320. Here, while the risk of shorting between separators is increased when there is insufficient volume of sealant at the sealing locations, if there is excess volume of sealant at the sealing locations, it is necessary to do the work of removing the jutting out sealant (burr) (burr removal). With the unit cell 140f of the seventh embodiment, the end part folded back part 317 is formed at the end part of the anode side separator 310f, so a buffer space for the excess sealant between the anode side separator 310f and the cathode side separator 320 is ensured, so even if an excess volume of sealant is arranged between the separators, it is not necessary to do the work of removing sticking out sealant, so it is possible to effectively suppress the occurrence of shorting a space between the separators while suppressing greater complexity of the work processes.

H. Eighth Embodiment:

FIG. 23A, FIG. 23B, FIG. 24A and FIG. 24B are explanatory drawings showing the cross section constitution of the unit cell 140g constituting the fuel cell 100 of the eighth embodiment. FIG. 23A shows the A1-A1 cross section of FIG. 3A, FIG. 23 B shows the B1-B1 cross section of FIG. 3A, FIG. 24A shows the C1-C1 cross section of FIG. 3B, and FIG. 24B shows the D1-D1 cross section of FIG. 3B.

The constitution of the unit cell 140g of the eighth embodiment differs from the constitution of the unit cell 140f of the seventh embodiment in regards to the point of the constitution of the end part folded back part 317g formed at the end part along the surface direction of the anode side separator 310g, and is the same as the constitution of the unit cell 140f of the seventh embodiment in regards to the other points. With the unit cell 140g of the eighth embodiment, the position along the direction roughly perpendicular to the surface direction (stacking direction) of the parallel part of the end part folded back part 317g formed on the end part of the anode side separator 310g is the same as the position of the furthest outside part of the dimple 319. With the unit cell 140g of the eighth embodiment, the furthest outside part of the dimple 319 is the part for which the position along the stacking direction is most distant from the cathode side separator 320 among the parts other than the end part folded back part 317g at the anode side separator 310.

Note that FIG. 23A through FIG. 24B show the constitution near the fuel gas supply manifold 162 and the oxidizing gas supply manifold 152 with the unit cell 140g, but the constitution near the fuel gas exhaust manifold 164 and the oxidizing gas exhaust manifold 154 is also the same.

With the unit cell 140g constituting the fuel cell 100 of the eighth embodiment, the same as with the first embodiment, the folded back parts 322 and 325 are formed on the cathode side separator 320, so it is possible to achieve both ensuring of the gas flow path and ensuring of the gas sealing properties at the reaction gas lead-in/out part while suppressing greater complexity of the processing steps and an increase in the size of the fuel cell.

Also, with the unit cell 140g of the eighth embodiment, the same as with the seventh, embodiment, the end part folded back part 317g is formed at the end part of the anode side separator 310g, so it is possible to effectively suppress the occurrence of shorting of the separators while suppressing greater complexity of the work steps, and it is also possible to suppress bending deformation of the end part.

Figure 25:
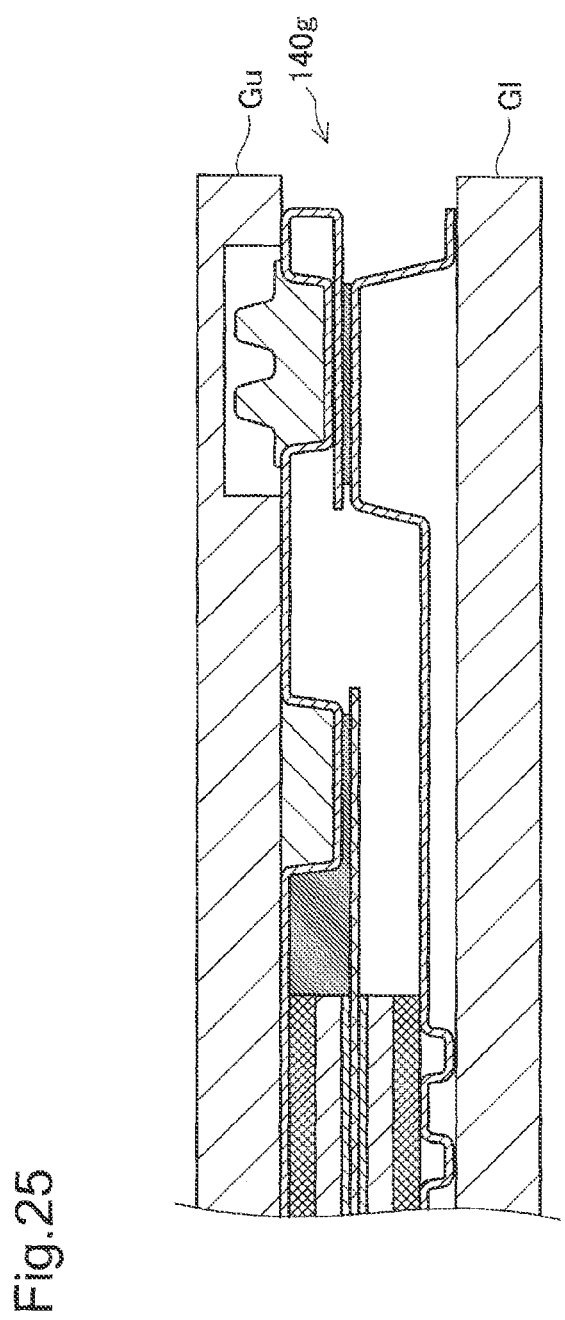
FIG. 25 is an explanatory drawing showing the state of the thermal compression process of the unit cell with the eighth embodiment.

Furthermore, with the unit cell 140g of the eighth embodiment, it is possible to improve the quality of the unit cell by improving the precision of the thermal compression process. FIG. 25 is an explanatory drawing showing the state of the thermal compression process of the unit cell with the eighth embodiment. As shown in FIG. 25, with the thermal compression process when manufacturing a unit cell (step S150 in FIG. 7), the work piece for which each layer constituting unit cell 140g has been stacked is placed on a lower side jig Gl, and the work piece is pressed by the upper side jig Gu and the lower side jig Gl. Here, with the unit cell 140g of the eighth embodiment, the position along the direction roughly perpendicular to the surface direction of the parallel part of the end part folded back part 317g matches the position of the dimple 319 positioned furthest to the outside of the anode side separator 310g, and the parts other than the convex parts 327, 324, and 329 of the cathode side separator 320 are flat shapes (specifically, the position along the direction roughly perpendicular to the surface direction is the same). Because of that, as shown in FIG. 25, it is possible to use a flat shaped jig for which it is not necessary to implement irregularity processing on the work piece side surface, and also, as the upper side jig Gu, it is possible to use a flat shaped jig for which it is not necessary to implement irregularity processing on the work piece side surface with the parts other than the excavated part for avoiding interference with the gasket 500. This kind of flat shaped jig has good positional precision for the work piece side surface, and is an item for which the occurrence of internal distortion that comes with processing is suppressed. Also, the upper side jig Gu is flat shaped for the parts other than the excavated part, so the volume proportion of the excavated part to the overall volume is low, so this is an item for which the occurrence of warpage is low. Therefore, with the thermal compression process for manufacturing the unit cell 140g of the eighth embodiment, it is possible to use a jig for which the work piece side surface position precision is good, and the occurrence of internal distortion and warpage is suppressed, and as a result, it is possible to improve the precision of the manufactured unit cell 140g. In particular, with the thermal compression process for manufacturing the unit cell 140g of the eighth embodiment, it is possible to improve the precision of the position along the stacking direction of the circumference part of the gasket 500, so it is possible to suppress a decrease in precision of the position of the circumference part of the gasket 500, a decrease in the seal reaction force, and the occurrence of gas leaks.

I. Ninth Embodiment:

FIG. 26A, FIG. 26B, FIG. 27A and FIG. 27B are explanatory drawings showing the cross section constitution of the unit cell 140h constituting the fuel cell 100 of the ninth embodiment. FIG. 26A shows the A1-A1 cross section of FIG. 3A, FIG. 26B shows the B1-B1 cross section of FIG. 3A, FIG. 27A shows the C1-C1 cross section of FIG. 3B, and FIG. 27B shows the D1-D1 cross section of FIG. 3B.

The constitution of the unit cell 140h of the ninth, embodiment differs from the constitution of the unit cell 140f of the seventh embodiment in regards to the point of the constitution of the anode side separator 310h and the cathode side separator 320h, and is the same as the constitution of the unit cell 140f of the seventh embodiment in regards to the other points. With the unit cell 140h of the ninth embodiment, the dimple 319h is formed on the cathode side separator 320h rather than the anode side separator 310h. Also, with the unit cell 140h of the ninth embodiment, the same as with the seventh embodiment, the end part folded back part 317 folded back in the direction separating from the cathode side separator 320h is formed at the end part along the surface direction of the anode side separator 310h. The position along the stacking direction of the parallel part of the end part folded back part 317 is the same as the position of the flat part of the anode side separator 310h.

Also, with the unit cell 140h of the ninth embodiment, a convex part 338 with a convex shape in the direction separating from the anode side separator 310h along the stacking direction is formed on the circumference of the gasket 500. The position along the stacking direction of the part parallel to the surface direction of the convex part 338 is the same as the position of the part furthest to the outside of the dimple 319b. The convex part 338 corresponds to the third convex part of the present invention.

Note that FIG. 26A through FIG. 27B show the constitution near the fuel gas supply manifold 162 and the oxidizing gas supply manifold 152 of the unit cell 140h, but the constitution near the fuel gas exhaust manifold 164 and the oxidizing gas exhaust manifold 154 is also the same.

With the unit cell 140h constituting the fuel cell 100 of the ninth embodiment, the same as with the first embodiment, the folded back parts 322 and 325 are formed on the cathode side separator 320*h*, so it is possible to achieve both ensuring of the gas flow path and ensuring of the gas sealing properties at the reaction gas lead-in/out part while suppressing greater complexity of the processing steps and an increase in the size of the fuel cell.

With the unit cell 140*h* of the ninth embodiment, the same as with the seventh embodiment, the end part folded back part 317 is formed on the end part of the anode side separator 310*h*, so it is possible to effectively suppress the occurrence of shorting of the separators while suppressing greater complexity of work processes, and also is possible to suppress bending deformation of the end part.

Figure 28:
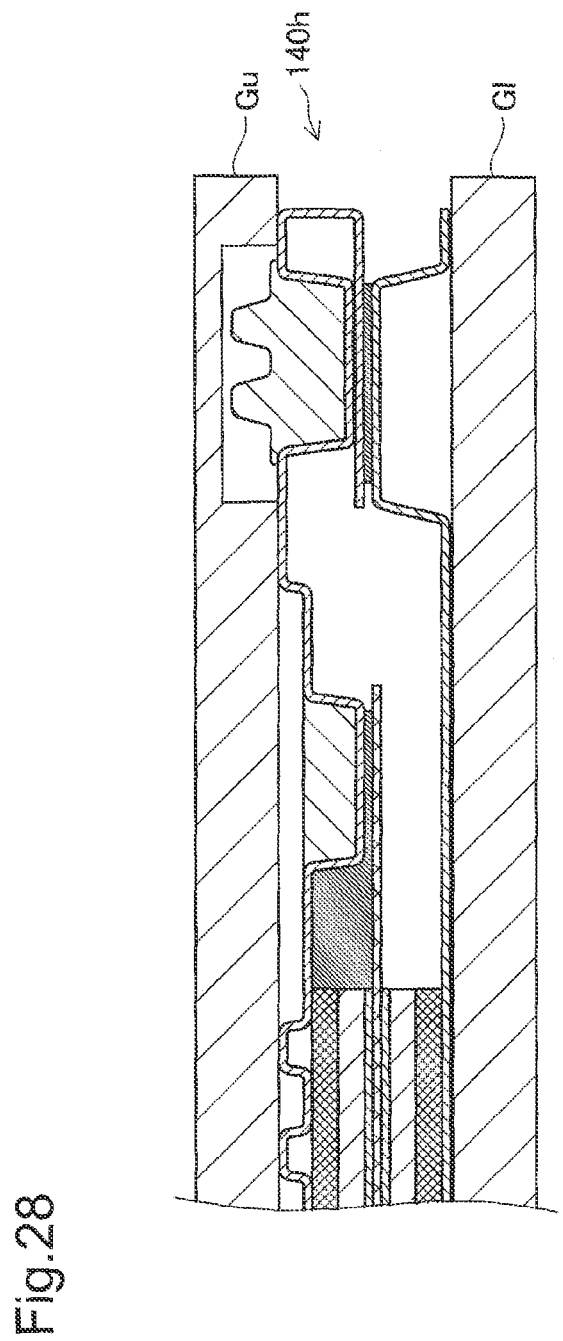
FIG. 28 is an explanatory drawing showing the state of the thermal compression process of the unit cell of the ninth embodiment.

Furthermore, with the unit cell 140*h* of the ninth embodiment, the same as with the eighth embodiment, it is possible to improve the quality of the unit cell by improving the precision of the thermal compression process precision. FIG. 28 is an explanatory drawing showing the state of the thermal compression process of the unit cell of the ninth embodiment. With the unit cell 140*h* of the ninth embodiment, the position along the direction roughly perpendicular to the surface direction of the parallel part of the end part folded back part 317 matches the position of the flat part of the anode side separator 310*h*, and the position along the stacking direction of the parallel part in the surface direction with the convex part 338 of the cathode side separator 320*h* is the same as the position of the part farthest outside the dimple 319*h*. Because of that, as shown in FIG. 28, as the lower jig Gl for the thermal compression process, it is possible to use a flat shaped jig for which it is not necessary to implement irregularity processing on the work piece side surface, and it is also as the upper jig Gu, it is possible to use a flat shaped jig for which it is not necessary to implement irregularity processing on the work piece side surface at the part other than the excavated part to avoid interference with the gasket 500. Therefore, with the thermal compression process for manufacturing the unit cell 140*h* of the ninth embodiment, it is possible to use a jig for which the work piece side surface position precision is good- and for which the occurrence of internal distortion and warpage is suppressed, and as a result, it is possible to improve the precision of the manufactured unit cell 140*g*. In particular, with the thermal compression process for manufacturing the unit cell 140*h* of the ninth embodiment, it is possible to improve the precision of the position along the stacking direction of the circumference part of the gasket 500, so it is possible to suppress a decrease in the precision of the position of the circumference part of the gasket 500, a decrease in the seal reaction force, and the occurrence of gas leaks. Also, with the thermal compression process for manufacturing the unit cell 140*h* of the ninth embodiment, because the contact area of the lower jig Gl and the work piece becomes larger, it is possible to apply the load evenly to the work piece, and it is possible to improve the precision of the manufactured unit cell 140*g*.

Also, with the unit cell 140*h* of the ninth embodiment, a dimple 319*h* is formed on the cathode side which has a lot of generated water, so by sucking up and holding the generated water inside the cathode side porous body flow path layer 230 in the space between the dimple 319*h* and the cathode side porous body flow path layer 230, it is possible to suppress the inhibition of flow-through of the fuel gas in the cathode side porous body flow bath layer 230 due to generated water, and also possible to improve the generated water exhaust capability.

J. Modifications:

The present invention is not limited to the aforementioned embodiments and aspects, and it may be actualized in diversity of other embodiments and aspects within the scope of the invention, and for example the following modifications are possible.

J1. Modification 1:

The constitution of the fuel cell system 10 of each of the aforementioned embodiments is nothing more than an example, and the constitution of the fuel cell system 10 may be changed in various ways. For example, with each of the aforementioned embodiments, the power generating module 200 contains the anode side porous body flow path layer 220 and the cathode side porous body flow path layer 230, but as shown in FIG. 29A and FIG. 29B, it is also possible to not have the power generating module 200 contain a porous body flow path layer. With the unit cell 140 of the modification shown in FIG. 29A and FIG. 29B as well, it is possible to achieve both ensuring of the gas flow path and ensuring of the gas sealing properties at the reaction gas lead-in/out part while suppressing greater complexity of the processing steps and an increase in the size of the fuel cell. Also, with each of the aforementioned embodiments, a plurality of communication holes 326 are provided at the perpendicular part of the folded back parts 322 and 325, but it is also possible to have continuous slit shaped openings provided instead of the plurality of communication holes 326. It is also possible to have the power generating module 200 not include the anode side diffusion layer 216 and the cathode side diffusion layer 217.

Also, with each of the aforementioned embodiments, the material of each part constituting the fuel cell 100 is specified, but this is not limited to these materials, and it is possible to use various suitable materials. For example, the cathode side porous body flow path layer 230 and the anode side porous body flow path layer 220 are formed using a metal porous body, but it is also possible to form them using another material such as a carbon porous body.

J2. Modification 2:

With the unit cell 140 of each of the aforementioned embodiments, it is also possible to reverse the cathode side and the anode side. Specifically, with the constitution of the unit cell 140 of each of the aforementioned embodiments, the folded back parts 322 and 325 are formed on the cathode side separator 320, and a folded back part is not formed on the anode side separator 310, but it is also possible to do the opposite and adopt a constitution that has a folded back part formed on the anode side separator 310, and does not have a folded back part formed on the cathode side separator 320. In the case of this kind of constitution, it is preferable that for the length along the surface direction of the folded back part, conversely to each of the aforementioned embodiments, the folded back parts adjacent to the openings 321 and 311 constituting the fuel gas supply manifold 162 and the fuel gas exhaust manifold 164 are longer than the folded back part adjacent to the openings 323 and 321 constituting the oxidizing gas supply manifold 152 and the oxidizing gas exhaust manifold 154. Specifically, the length of the folded back part adjacent to the opening constituting the manifold that flows the reaction gas used with the separator side electrode on which the folded back part is formed is preferably longer than the length of the folded back part adjacent to the opening constituting the manifold for flowing reaction gas used by the opposite side electrodes. Also, the length of the folded back part adjacent to the opening constituting the manifold for flowing reaction gas used by the separator side electrode on which the folded back part is formed is preferably of a length such that it overlaps the electrolyte membrane 212 along the stacking direction (direction roughly perpendicular to the surface direction), and the length of the folded back part adjacent to the opening constituting the manifold for flowing reaction gas used by the opposite side electrode is preferably of a length such that it does not overlap the electrolyte membrane 212 along the stacking direction.

Also, with each of the aforementioned embodiments, folded back parts are formed adjacent to all the openings constituting manifolds (oxidizing gas supply manifold 152, fuel gas supply manifold 162, oxidizing gas exhaust manifold 154, and fuel gas exhaust manifold 164), but it is also possible to form folded back parts adjacent only to a part of the openings.

J3. Modification 3:

With the second embodiment noted above, the convex part 324*a* formed on the cathode side separator 320 is divided by two flat parts FP, but the flat part FP can also be provided at the position of convex part 502 of the gasket 500 formed on the convex part 324*a*, and the number of these is not limited to two locations.

J4. Modification 4:

With the third embodiment noted above, in regards to the length along the surface direction of each layer constituting the power generating module 200*b*, it is not absolutely necessary to have the length of each anode side layer be the same as the length of the electrolyte membrane 212. With the third embodiment, if the length of each cathode side layer is shorter than the length of each anode side layer, then each anode layer is arranged at least at part of the part for which each cathode side layer is not formed on the electrolyte membrane 212, so the electrolyte membrane 212 is reinforced and it is possible to suppress the occurrence of cross leak, and it is possible to suppress the occurrence of shorting by direct contact of each of the cathode side layers with each of the anode side layers.

Also, with the third embodiment noted above, it is also possible to have the length only of the anode 214*b* and the anode side diffusion layer 216*b* within each anode side layer be longer than the length of each cathode layer, and to have the length of the anode side porous body flow path layer 220*b* be the same as the length of each cathode layer. Even if done this way, the electrolyte membrane 212 is reinforced, so it is possible to suppress the occurrence of cross leak, and it is possible to suppress the occurrence of shorting with direct contact between each cathode side layer and each anode side layer.

What is claimed is:

1. A fuel cell comprising:
   a membrane electrode assembly including an electrolyte membrane and electrode layers arranged on each surface of the electrolyte membrane respectively, and
   first and second separators that are formed by processing a metal plate and are arranged so as to sandwich the membrane electrode assembly,
   wherein at a position outside a position facing the membrane electrode assembly, the first and second separators have an opening that constitutes a reaction gas flow path that is roughly perpendicular to a surface direction that is parallel to a surface of the membrane electrode assembly,
   the first separator has a folded back part that is formed by folding back at least part of the metal plate of the position at which the opening is formed toward the membrane electrode assembly side along a boundary line on the membrane electrode assembly side of the opening as a fold line,
   the folded back part has a communication hole that allows communication between an internal flow path space and the reaction gas flow path, the internal flow path space being a space communicated with an end surface of the membrane electrode assembly and being formed between the folded back part and the first separator, and
   the second separator does not have the folded back part.

2. The fuel cell in accordance with claim 1, wherein
   a sealant is placed between the folded back part of the first separator and the second separator.

3. The fuel cell in accordance with claims 1, wherein
   the length along the surface direction of a first folded back part which is the folded back part adjacent to the opening that constitutes the reaction gas flow path in which reaction gas used by the electrode of the first separator side of the membrane electrode assembly flows is longer than the length along the surface direction of a second folded back part which is the folded back part adjacent to the opening that constitutes the reaction gas flow path in which reaction gas used by the electrode of the second separator side of the membrane electrode assembly flows.

4. The fuel cell in accordance with claim 3, wherein
   the length along the surface direction of the electrolyte membrane at a position facing the opening is longer than the length along the surface direction of the electrode layer,
   the length of the first folded back part is such length as the first folded back part overlaps the electrolyte membrane along the direction roughly perpendicular to the surface direction, and
   the length of the second folded back part is such length as the second folded back part does not overlap the electrolyte membrane along the direction roughly perpendicular to the surface direction.

5. The fuel cell in accordance with claim 4, wherein
   a sealant is placed between the first folded back part of the first separator and the second separator, between the first folded back part of the first separator and the electrolyte membrane, between the second folded back part of the first separator and the second separator, and between a part of the first separator at a position farther from an edge of the first separator than the second folded back part and the electrolyte membrane, and
   positions of the sealants along the direction roughly perpendicular to the surface direction are the same.

6. The fuel cell in accordance with claims 1, further comprising:
   a gas diffusion layer arranged between the membrane electrode assembly and the first separator and between the membrane electrode assembly and the second separator,
   wherein the length along the surface direction of the gas diffusion layer of the first separator side is shorter than the length along the surface direction of the gas diffusion layer of the second separator side and than the length along the surface direction of the electrolyte membrane.

7. The fuel cell in accordance with claims 1, wherein
   at a position facing the folded back part of the first separator, a plurality of first convex parts aligned along a direction roughly parallel to the fold line are formed by press working of the metal plate, each of the first convex parts having a convex shape along a direction from the first separator to the second separator.

8. The fuel cell in accordance with claim 7, wherein
   each of the plurality of first convex parts is divided into parts by a flat shaped flat part provided at a plurality of positions aligned along a direction from the opening to the membrane electrode assembly, and on the flat part are arranged a gasket for sealing the opening enclosing in the surface direction, and a gasket for sealing an outer periphery of the fuel cell enclosing in the surface direction.

9. The fuel cell in accordance with claims 1, wherein the folded back part has at a tip position a tip side folded back part that is folded toward the first separator.

10. The fuel cell in accordance with claim 9, wherein the tip side folded back part is of a shape for which a tip of the tip side folded back part reaches a surface of the first separator, and has a communication hole for allowing gas to pass through.

11. The fuel cell in accordance with claims 1, wherein at an end part of the second separator along the surface direction is formed an end part folded back part that is folded in a direction separating from the first separator.

12. The fuel cell in accordance with claim 11, wherein at a tip position of the end part folded back part of the second separator is formed an end part parallel part which is roughly parallel to the surface direction and for which a position along the direction roughly perpendicular to the surface direction is the same as a position of a part furthest separated from the first separator other than the end part folded back part of the second separator.

13. The fuel cell in accordance with claim 12, wherein the second separator has at a position facing the membrane electrode assembly a plurality of second convex parts for ensuring a space for cooling medium flow between the second convex part and the first separator that is adjacent the second convex part along a direction roughly perpendicular to the surface direction without intervention of the membrane electrode assembly, and the part that is furthest separated from the first separator other than the end part folded back part at the second separator is the furthest outside part of the second convex part.

14. The fuel cell in accordance with claim 12, wherein the first separator has at a position facing the membrane electrode assembly a plurality of second convex parts for ensuring a space for cooling medium flow between the second convex part and the second separator that is adjacent the second convex part along a direction roughly perpendicular to the surface direction without intervention of the membrane electrode assembly, and at a position facing the folded back part of the first separator is formed a third convex part for which a position along the direction roughly perpendicular to the surface direction is the same as a position of the furthest outside part of the second convex part.

15. The fuel cell in accordance with claim 11, wherein a sealant is positioned between a part other than the end part folded back part of an end part of the second separator along the surface direction and the first separator.

16. The fuel cell in accordance with claims 1, further comprising:
a gas diffusion layer arranged between the membrane electrode assembly and the first separator and between the membrane electrode assembly and the second separator, and
a pair of porous body flow path layers formed using a porous body for supplying reaction gas to the gas diffusion layer arranged between the respective gas diffusion layers and the respective first and second separators.

* * * * *

UNITED STATES PATENT AND TRADEMARK OFFICE
CERTIFICATE OF CORRECTION

PATENT NO. : 8,450,024 B2
APPLICATION NO. : 13/388221
DATED : May 28, 2013
INVENTOR(S) : Takeshi Nagasawa et al.

It is certified that error appears in the above-identified patent and that said Letters Patent is hereby corrected as shown below:

On the title page, column 1, item (75), please correct the spelling of the fourth inventor's name from "Kazutaka Ilsuka" to --Kazutaka Iizuka-- as follows:

Item (75) Inventors: Takeshi Nagasawa, Okazaki (JP); Kazuhiro Watanabe, Toyota (JP); Takuji Nagano, Toyota (JP); Kazutaka Iizuka, Nissin (JP); Rie Takami, Nishikamo (JP); Naotoshi Miyamoto, Toyota (JP)

Signed and Sealed this
Twentieth Day of May, 2014

Michelle K. Lee
*Deputy Director of the United States Patent and Trademark Office*